(12) United States Patent
Borchardt et al.

(10) Patent No.: US 9,393,757 B2
(45) Date of Patent: *Jul. 19, 2016

(54) DISCONTINUOUSLY LAMINATED FILM STRUCTURES WITH IMPROVED VISUAL CHARACTERISTICS

(71) Applicant: THE GLAD PRODUCTS COMPANY, Oakland, CA (US)

(72) Inventors: Michael G. Borchardt, Naperville, IL (US); Theodore J. Fish, Willowbrook, IL (US); Kenneth E. Cisek, Willowbrook, IL (US); Robert T. Dorsey, Western Springs, IL (US)

(73) Assignee: The Glad Products Company, Oakland, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 13/838,394

(22) Filed: Mar. 15, 2013

(65) Prior Publication Data

US 2013/0243982 A1    Sep. 19, 2013

Related U.S. Application Data

(63) Continuation-in-part of application No. 13/454,412, filed on Apr. 24, 2012, and a continuation-in-part of application No. 13/454,474, filed on Apr. 24, 2012, and a continuation-in-part of application No.
(Continued)

(51) Int. Cl.
*B32B 3/30* (2006.01)
*B29D 99/00* (2010.01)
(Continued)

(52) U.S. Cl.
CPC . *B32B 3/30* (2013.01); *B29C 55/18* (2013.01); *B29D 99/00* (2013.01); *B32B 1/02* (2013.01);
(Continued)

(58) Field of Classification Search
CPC ........ B29C 55/18; B29C 55/06; B29C 55/08; B32B 27/12; B32B 1/02; B32B 38/06; B32B 3/28; Y10S 428/91; Y10T 428/24612; Y10T 428/24628; Y10T 428/2457; Y10T 428/1334; Y10T 156/1015; B29D 99/00
USPC .......................................................... 383/119
See application file for complete search history.

(56) References Cited

U.S. PATENT DOCUMENTS 2,593,328 A * 4/1952 Meaker .......................... 383/101
2,714,571 A    8/1955 Irion et al.
(Continued)

FOREIGN PATENT DOCUMENTS

WO    9013702    11/1990
WO    9956953    11/1999

OTHER PUBLICATIONS

International Search Report, mailed Jul. 25, 2014, from counterpart PCT/US 14/028109, filing date Mar. 14, 2014.

*Primary Examiner* — Peter Helvey
(74) *Attorney, Agent, or Firm* — Thomas C. Feix

(57) ABSTRACT

In one example embodiment, a laminated film includes an extruded ribbed first film portion that includes multiple ribs, where consecutive ribs are separated by webs that are integral with the ribs. The laminated film also includes an un-ribbed second film portion, and a region of discontinuous lamination between the first film portion and the second film portion. The region of discontinuous lamination includes multiple regions where the first and second film portions are bonded together, and multiple regions where the first and second film portions are not bonded together.

20 Claims, 23 Drawing Sheets

Related U.S. Application Data

13/552,352, filed on Jul. 18, 2012, and a continuation-in-part of application No. 13/660,844, filed on Oct. 25, 2012, now Pat. No. 8,865,294, and a continuation-in-part of application No. 12/947,025, filed on Nov. 16, 2010, now Pat. No. 8,603,609.

(60) Provisional application No. 61/478,639, filed on Apr. 25, 2011, provisional application No. 61/478,643, filed on Apr. 25, 2011.

(51) Int. Cl.
- B32B 1/02 (2006.01)
- B29C 55/18 (2006.01)
- B32B 38/06 (2006.01)
- B32B 3/28 (2006.01)
- B29C 55/06 (2006.01)
- B29C 55/08 (2006.01)

(52) U.S. Cl.
CPC . B32B 3/28 (2013.01); B32B 38/06 (2013.01); B29C 55/06 (2013.01); B29C 55/08 (2013.01); Y10T 156/1015 (2015.01); Y10T 428/1334 (2015.01); Y10T 428/2457 (2015.01)

(56) References Cited

U.S. PATENT DOCUMENTS

| | | | | |
|---|---|---|---|---|
| 3,029,853 | A * | 4/1962 | Piazze | 383/75 |
| 3,058,868 | A | 10/1962 | Schroeder | |
| 3,130,647 | A * | 4/1964 | Anderson et al. | 493/193 |
| 3,220,057 | A * | 11/1965 | Walton | 425/385 |
| 3,224,574 | A * | 12/1965 | McConnell et al. | 242/160.1 |
| 3,318,759 | A * | 5/1967 | Anderson | 428/340 |
| 3,322,613 | A * | 5/1967 | Rasmussen | 428/484.1 |
| 3,485,437 | A * | 12/1969 | Gruentzel et al. | 383/107 |
| 3,494,457 | A * | 2/1970 | Titchenal | 206/484 |
| 3,549,381 | A * | 12/1970 | Kinsinger | 426/77 |
| 3,550,839 | A * | 12/1970 | Clayton et al. | 383/116 |
| 3,622,422 | A | 11/1971 | Newman et al. | |
| 3,735,918 | A * | 5/1973 | Tundermann | 383/32 |
| 3,746,607 | A * | 7/1973 | Harmon et al. | 428/167 |
| 3,760,940 | A * | 9/1973 | Bustin | 383/35 |
| 3,772,968 | A * | 11/1973 | Ruda | 493/225 |
| 3,857,144 | A | 12/1974 | Bustin | |
| 3,973,063 | A * | 8/1976 | Clayton | 428/35.2 |
| 3,984,047 | A * | 10/1976 | Clayton et al. | 383/119 |
| 4,076,121 | A * | 2/1978 | Clayton et al. | 206/390 |
| 4,116,892 | A | 9/1978 | Schwarz | |
| 4,153,664 | A | 5/1979 | Sabee | |
| 4,153,751 | A | 5/1979 | Schwarz | |
| 4,273,549 | A * | 6/1981 | Pezzana et al. | 493/196 |
| 4,289,832 | A | 9/1981 | Schwarz | |
| 4,302,495 | A | 11/1981 | Marra | |
| 4,343,848 | A | 8/1982 | Leonard, Jr. | |
| 4,379,197 | A | 4/1983 | Cipriani | |
| 4,438,167 | A | 3/1984 | Schwarz | |
| 4,517,714 | A | 5/1985 | Sneed et al. | |
| 4,518,643 | A * | 5/1985 | Francis | 428/131 |
| 4,522,203 | A | 6/1985 | Mays | |
| 4,614,679 | A | 9/1986 | Farrington et al. | |
| 4,629,064 | A * | 12/1986 | Barner | 206/204 |
| 4,692,368 | A | 9/1987 | Taylor et al. | |
| 4,704,238 | A | 11/1987 | Okuyama et al. | |
| 4,753,840 | A | 6/1988 | Van Gompel | |
| 4,793,885 | A * | 12/1988 | Rasmussen | 156/200 |
| 4,814,135 | A | 3/1989 | Heitz | |
| 4,846,586 | A * | 7/1989 | Bruno | 383/9 |
| 4,857,600 | A | 8/1989 | Gross et al. | |
| 4,890,936 | A * | 1/1990 | Cooper | 383/109 |
| 4,925,711 | A * | 5/1990 | Akao et al. | 428/35.2 |
| 4,930,905 | A | 6/1990 | Sharps, Jr. | |
| 4,993,844 | A * | 2/1991 | Robinson et al. | 383/38 |
| 5,028,289 | A * | 7/1991 | Rasmussen | 156/229 |
| 5,035,941 | A | 7/1991 | Blackburn | |
| 5,076,988 | A | 12/1991 | Rifi | |
| 5,078,508 | A * | 1/1992 | Johan et al. | 383/75 |
| 5,100,721 | A | 3/1992 | Akao | |
| 5,133,607 | A * | 7/1992 | Bonke | 383/75 |
| 5,153,382 | A | 10/1992 | Gross et al. | |
| 5,167,897 | A * | 12/1992 | Weber et al. | 264/288.8 |
| 5,205,650 | A * | 4/1993 | Rasmussen | 383/107 |
| 5,293,184 | A * | 3/1994 | Ishizuka | 347/1 |
| 5,296,184 | A | 3/1994 | Wu et al. | |
| 5,382,461 | A | 1/1995 | Wu | |
| 5,390,875 | A * | 2/1995 | Gietman et al. | 242/521 |
| 5,422,172 | A | 6/1995 | Wu | |
| 5,455,992 | A * | 10/1995 | Kurschatke et al. | 26/99 |
| 5,518,801 | A | 5/1996 | Chappell et al. | |
| 5,554,093 | A * | 9/1996 | Porchia et al. | 493/240 |
| 5,650,214 | A * | 7/1997 | Anderson et al. | 428/152 |
| 5,716,137 | A * | 2/1998 | Meyer | 383/75 |
| 5,804,265 | A * | 9/1998 | Saad et al. | 428/35.2 |
| 5,851,937 | A | 12/1998 | Wu et al. | |
| 5,861,074 | A | 1/1999 | Wu | |
| 5,865,926 | A | 2/1999 | Wu et al. | |
| 5,881,883 | A * | 3/1999 | Siegelman | 206/720 |
| 5,885,262 | A * | 3/1999 | Wheeler | 604/327 |
| 6,013,151 | A | 1/2000 | Wu et al. | |
| 6,059,458 | A * | 5/2000 | Belias et al. | 383/75 |
| 6,139,185 | A | 10/2000 | Hamilton et al. | |
| 6,139,186 | A * | 10/2000 | Fraser | 383/77 |
| 6,150,647 | A | 11/2000 | Anderson et al. | |
| 6,183,856 | B1 * | 2/2001 | Amon | 428/318.4 |
| 6,194,060 | B1 * | 2/2001 | Amon et al. | 428/315.9 |
| 6,214,147 | B1 | 4/2001 | Mortellite et al. | |
| 6,254,736 | B1 | 7/2001 | Earl et al. | |
| 6,264,872 | B1 * | 7/2001 | Majors et al. | 264/284 |
| 6,265,045 | B1 | 7/2001 | Mushaben | |
| 6,361,784 | B1 | 3/2002 | Brennan et al. | |
| 6,368,444 | B1 * | 4/2002 | Jameson et al. | 156/229 |
| 6,385,818 | B1 | 5/2002 | Savicki, Sr. | |
| 6,394,651 | B2 | 5/2002 | Jackson | |
| 6,394,652 | B2 | 5/2002 | Meyer et al. | |
| 6,402,377 | B1 * | 6/2002 | Vo et al. | 383/75 |
| 6,416,452 | B1 * | 7/2002 | Meyer | 493/210 |
| 6,513,975 | B1 | 2/2003 | Jackson et al. | |
| 6,569,527 | B1 * | 5/2003 | Calhoun et al. | 428/402 |
| 6,695,476 | B2 | 2/2004 | Jackson et al. | |
| 6,799,680 | B2 * | 10/2004 | Mak | 206/524.8 |
| 6,939,042 | B2 * | 9/2005 | Rusnak et al. | 383/71 |
| 6,966,697 | B2 * | 11/2005 | Patridge et al. | 383/107 |
| 7,132,151 | B2 | 11/2006 | Rasmussen | |
| 7,220,053 | B2 * | 5/2007 | Wu | 383/105 |
| 7,306,729 | B2 | 12/2007 | Bacino et al. | |
| 7,687,134 | B2 * | 3/2010 | Withers | 428/156 |
| 7,938,635 | B2 * | 5/2011 | Heilman et al. | 425/101 |
| 8,865,294 | B2 * | 10/2014 | Cisek | B32B 3/30 428/195.1 |
| 2002/0074691 | A1 | 6/2002 | Mortellite et al. | |
| 2002/0187361 | A1 * | 12/2002 | Amon | 428/516 |
| 2003/0007704 | A1 * | 1/2003 | Miller | 383/76 |
| 2003/0024625 | A1 * | 2/2003 | McAmish et al. | 156/73.1 |
| 2004/0134923 | A1 | 7/2004 | Aquino et al. | |
| 2004/0179754 | A1 * | 9/2004 | Taheri | 383/38 |
| 2005/0123726 | A1 | 6/2005 | Broering et al. | 428/172 |
| 2005/0129337 | A1 | 6/2005 | Sabounjian | 383/117 |
| 2006/0083900 | A1 * | 4/2006 | Ashraf | 428/182 |
| 2006/0093766 | A1 | 5/2006 | Savicki et al. | |
| 2006/0148915 | A1 * | 7/2006 | Floyd et al. | 521/61 |
| 2006/0177161 | A1 * | 8/2006 | Turvey | 383/120 |
| 2007/0166503 | A1 | 7/2007 | Hannigan | |
| 2007/0257402 | A1 * | 11/2007 | Rasmussen | 264/339 |
| 2008/0031553 | A1 * | 2/2008 | Tokita et al. | 383/113 |
| 2008/0124461 | A1 | 5/2008 | Leener et al. | |
| 2008/0137995 | A1 * | 6/2008 | Fraser et al. | 383/75 |
| 2008/0241769 | A1 * | 10/2008 | Quintens et al. | 430/349 |
| 2009/0003736 | A1 * | 1/2009 | Alipour et al. | 383/42 |
| 2009/0029114 | A1 | 1/2009 | Cancio et al. | |
| 2009/0068427 | A1 * | 3/2009 | Patel et al. | 428/212 |
| 2009/0233041 | A1 | 9/2009 | Rasmussen | |
| 2009/0264847 | A1 * | 10/2009 | Ashton et al. | 604/367 |
| 2010/0040875 | A1 * | 2/2010 | Patel et al. | 428/338 |

(56) References Cited

U.S. PATENT DOCUMENTS

| | | |
|---|---|---|
| 2010/0046860 A1* | 2/2010 | Kent et al. .................. 383/75 |
| 2010/0046861 A1* | 2/2010 | Wilcoxen .................. 383/119 |
| 2010/0098354 A1* | 4/2010 | Fraser et al. ................ 383/72 |
| 2010/0195937 A1* | 8/2010 | Fraser et al. ............... 383/105 |
| 2010/0233439 A1 | 9/2010 | Stone et al. |
| 2011/0052105 A1* | 3/2011 | Wilcoxen et al. ........... 383/75 |
| 2011/0117307 A1 | 5/2011 | Fraser et al. |
| 2011/0255809 A1* | 10/2011 | Tucker et al. ............... 383/119 |
| 2011/0317945 A1* | 12/2011 | Waldron et al. ............ 383/119 |
| 2012/0033900 A1* | 2/2012 | Fraser et al. ............... 383/105 |
| 2012/0039550 A1* | 2/2012 | MacPherson et al. ........ 383/109 |
| 2012/0057811 A1* | 3/2012 | Tucker et al. ................ 383/72 |
| 2012/0063706 A1* | 3/2012 | Fraser et al. ............... 383/109 |
| 2012/0134606 A1* | 5/2012 | Borchardt ............. B65D 31/02 383/116 |
| 2012/0269465 A1 | 10/2012 | Dorsey et al. |
| 2013/0202853 A1* | 8/2013 | Bergman et al. ............. 428/167 |
| 2013/0209711 A1* | 8/2013 | Borchardt ............. B29C 55/18 428/34.8 |
| 2013/0209712 A1* | 8/2013 | Borchardt ............. B29C 55/18 428/34.8 |
| 2014/0119679 A1* | 5/2014 | Cisek ................... B32B 3/30 383/75 |

* cited by examiner

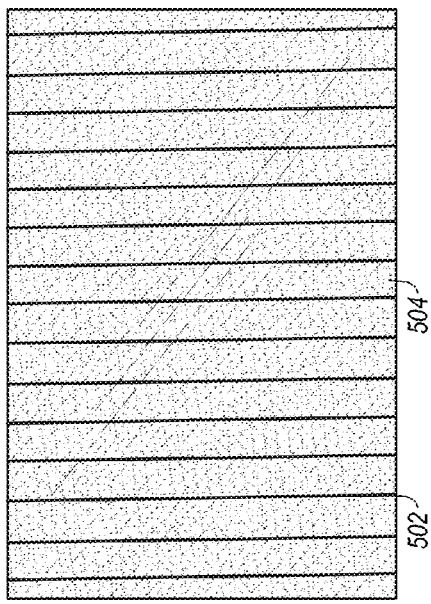
FIG. 5a-1
FIG. 5a-2

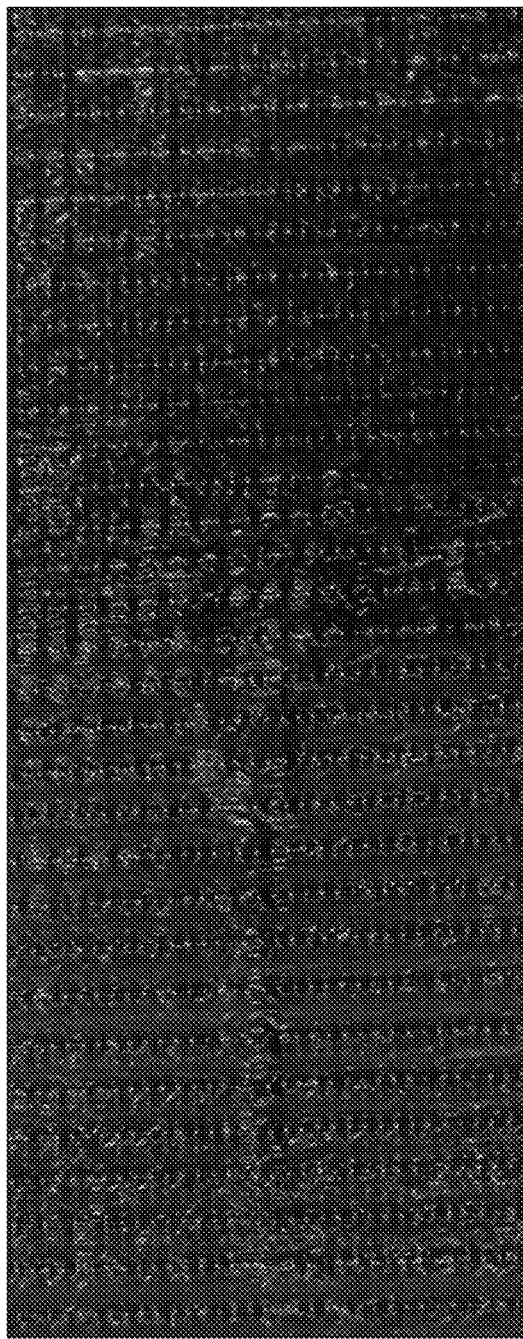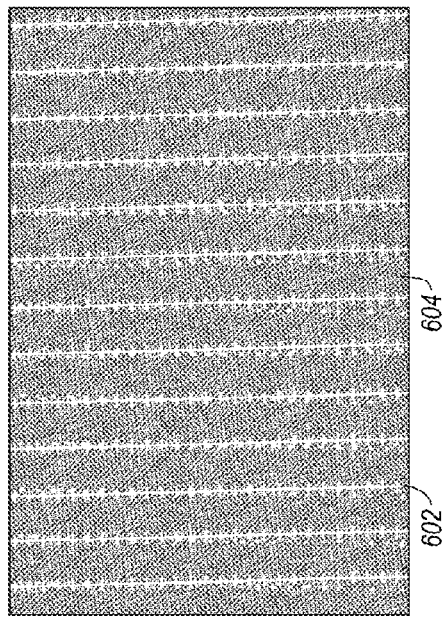

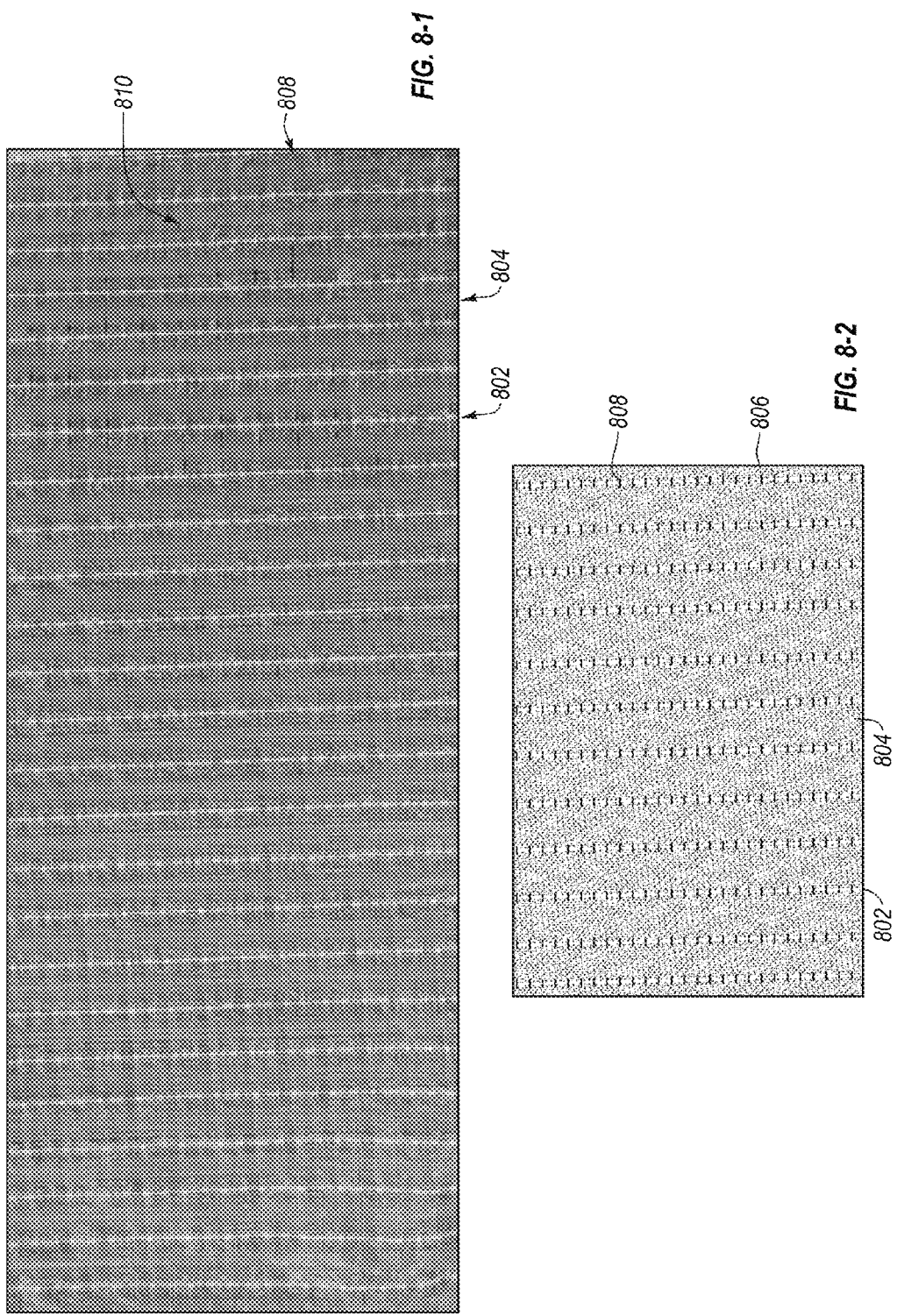

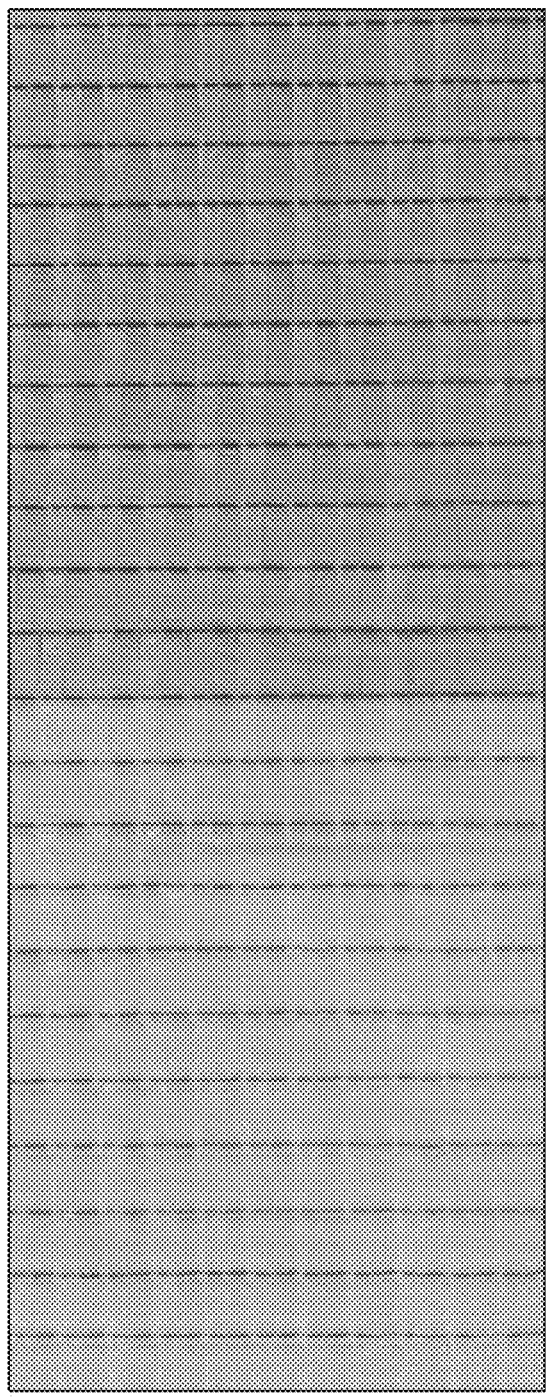
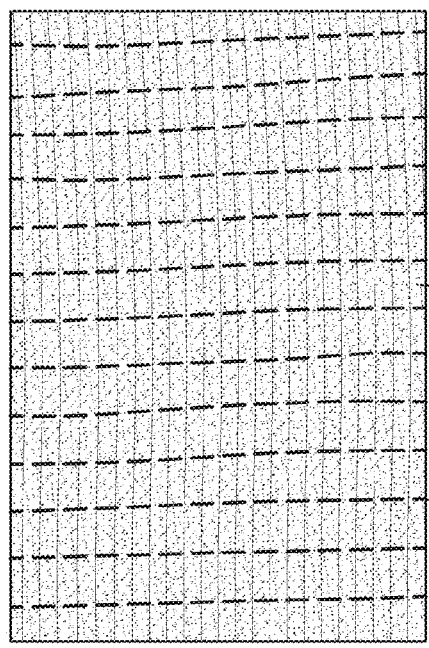
FIG. 11-1
FIG. 11-2

DISCONTINUOUSLY LAMINATED FILM STRUCTURES WITH IMPROVED VISUAL CHARACTERISTICS

RELATED APPLICATIONS

This application is related to the following United States Patent applications filed the same day herewith: RIBBED FILM STRUCTURES WITH PIGMENT CREATED VISUAL CHARACTERISTICS, Ser. No. 13/838,770; and, RIBBED FILM STRUCTURES WITH VOIDING AGENT CREATED VISUAL CHARACTERISTICS, Ser. No. 13/838,577. As well, this application is a continuation-in-part (CIP) of, and claims priority to, U.S. patent application Ser. No. 13/454,412, filed Apr. 24, 2012, entitled THERMOPLASTIC FILMS WITH VISUALLY-DISTINCT STRETCHED REGIONS AND METHODS FOR MAKING THE SAME, which claims priority to U.S. Patent Provisional Application Ser. No. 61/478,639, filed Apr. 25, 2011, entitled THERMOPLASTIC FILMS WITH VISUALLY-DISTINCT STRETCHED REGIONS AND METHODS FOR MAKING THE SAME. The present application also is a continuation-in-part (CIP) of, and claims priority to, U.S. patent application Ser. No. 13/454,474, filed Apr. 24, 2012, entitled MULTI-LAYER FILMS WITH VISUALLY-DISTINCT REGIONS AND METHODS OF MAKING THE SAME, which claims priority to U.S. Patent Provisional Application Ser. No. 61/478,643, filed Apr. 25, 2011, entitled MULTI-LAYER FILMS WITH VISUALLY-DISTINCT REGIONS AND METHODS OF MAKING THE SAME. The present application also is a continuation-in-part (CIP) of, and claims priority to, U.S. patent application Ser. No. 13/552,352, filed Jul. 18, 2012, entitled MULTI-PLY PUCKERED FILMS FORMED BY DISCONTINUOUS LAMINATION OF FILMS HAVING DIFFERENT REBOUND RATIOS, and is a continuation-in-part (CIP) of, and claims priority to, U.S. patent application Ser. No. 13/660,844, filed Oct. 25, 2012, entitled THERMOPLASTIC MULTI-PLY FILM WITH METALLIC APPEARANCE, and is a continuation-in-part (CIP) of, and claims priority to, U.S. patent application Ser. No. 12/947,025, filed Nov. 16, 2010, entitled DISCONTINUOUSLY LAMINATED FILM. All of the aforementioned applications are incorporated herein in their respective entireties by this reference.

BACKGROUND

As the costs of resin materials increase along with desires to minimize the impact of resin material waste, manufacturers are moving toward use of thinner and thinner gauges of resin films in their products. This is particularly true of manufacturers that implement high volumes of resin films in various forms, such as resin films for use in storage and waste products. While thinner gauge materials can represent obvious cost savings to the manufacturer, conventional production mechanisms can mean that use of thinner gauge film precursors results in lower durability of the end product. Although some recent technology may result, in some cases at least, in relatively thinner gauge products that may be as strong as their thicker counterparts, customers naturally sense from prior experience that thinner gauge materials are lower in quality and durability.

One instant cue to a customer of lower quality and durability of a bag is not only how thick or thin the bag feels, but also how thin or weak the bag "looks." Generally speaking, customers tend to view translucence as an indication of relatively low strength. Thus, despite the fact that some conventional mechanisms can improve some aspects of film strength while nevertheless using thinner gauge film materials, the translucence of such bags tends to cause customers to believe the bag is nevertheless low quality. Manufacturers may try to overcome these sorts of difficulties by adding colorants or voiding agents to minimize this issue.

Depending on how they are used, however, colorants and voiding agents can sometimes weaken the chemical bonds in the film, and create a still weaker film. Moreover, the use of certain colors in a film or film structure may present unique challenges. For example, films with a white color may employ a pigment such as titanium dioxide ($TiO2$). However, titanium dioxide is quite expensive and may significantly increase the cost of a film that employs such a pigment. Other conventional mechanisms involve using multiple, very low gauge films in a laminate structure, where at least one of the films is colored. However, the aforementioned types of color additions to film, and the types of film structures are not typically well-suited for some applications and/or have proven to be problematic for various reasons in addition to those noted above.

For example, one color changeable laminate structure (or "laminate") includes a pair of films in intimate contact with each other, and further includes a color generating film positioned adjacent one of the films. So long as the films are in intimate contact with each other, the laminate generates an interference color. However, absent intimate contact between the films, no color is generated. Thus, the color changeable laminate may not be well-suited for use in environments where, for example, delamination of the films is possible. As well, production processes for this structure can be difficult, and in some cases must be strictly controlled to ensure intimate contact throughout the entirety of the laminated films.

Another laminate displays a color change when the laminate is bent. This is achieved with a color generating metal disposed on a film of the laminate. The metal is in intimate contact with an anodic film, and creates color by light interference absorption effects. Absent intimate contact between the metal and the anodic film however, the color generation effects are not achieved. Moreover, production processes can be difficult, and in some cases must be strictly controlled to ensure intimate contact between all portions of the metal and the anodic film. As well, this laminate may not be well-suited for environments where: the use of metal is undesirable or impractical; delamination of the metal and anodic film is possible; and/or, it is desired to maintain the color of the laminate notwithstanding temporary or permanent changes to the geometry of the laminate.

As a final example, a further laminate structure can be constructed to display an irreversible color change upon delamination of two films in intimate contact with each other. Absent intimate initial contact between the films however, the color generation effects are not achieved. Thus, production processes must be strictly controlled to ensure intimate contact between the films so that when the films are delaminated, the desired effect is achieved. As well, this laminate may not be well-suited for environments where it is desired to maintain the color of the laminate notwithstanding temporary or permanent changes to the geometry of the laminate. Finally, this laminate structure may necessitate user intervention to effect the delamination necessary for achievement of the irreversible color change.

As the foregoing discussion suggests, there is a need for quality end products that, notwithstanding other aspects of their appearance and/or tactile impression, are configured to provide a positive indication to the consumer as to the quality of those products.

BRIEF SUMMARY OF AN EXAMPLE EMBODIMENT

One or more embodiments within the scope of the invention may be effective in overcoming one or more disadvantages in the art. One example embodiment is directed to a discontinuously laminated film that includes a first film portion that is ribbed, a second film portion that is un-ribbed; and a region of discontinuous lamination between the first film portion and the second film portion. The region of discontinuous lamination includes a plurality of regions where the first and second film portions are bonded together, and the region of discontinuous lamination also includes a plurality of regions where the first and second film portions are not bonded together. Improved strength in the end product is manifest, and is conveyed visually to the end user.

The foregoing embodiment is provided solely by way of example and is not intended to limit the scope of the invention in any way. Consistently, various other embodiments of a discontinuously laminated film, films, and associated production processes, within the scope of the invention are disclosed herein.

BRIEF DESCRIPTION OF THE DRAWINGS

The appended drawings contain figures of example embodiments to further illustrate and clarify various aspects of the present invention. It will be appreciated that these drawings depict only example embodiments of the invention and are not intended to limit its scope in any way. Aspects of the invention will be described and explained with additional specificity and detail through the use of the accompanying drawings in which:

FIGS. 3*a*-1 and 3*a*-2 depict a first example of a film, referred to herein as Film 'A', suitable for use in constructing one or more discontinuously laminated structures, where the film in FIGS. 3*a*-1 and 3*a*-2 is an un-stretched film;

FIGS. 3*b*-1 and 3*b*-2 depict a first variation of Film 'A,' where the film has been ring rolled in the machine direction;

FIGS. 3*c*-1 and 3*c*-2 are another depiction of the first variation of Film 'A,' where the film has been ring rolled in the machine direction;

FIGS. 3*d*-1 and 3*d*-2 depict a second variation of Film 'A,' where the film has been ring rolled first in the machine direction, and subsequently in the transverse direction;

FIGS. 4*a*-1 and 4*a*-2 depict a second example of a film, referred to herein as Film 'B', suitable for use in constructing one or more discontinuously laminated structures, where the film in FIGS. 4*a*-1 and 4*a*-2 is an un-stretched film;

FIGS. 4*b*-1 and 4*b*-2 depict a first variation of Film 'B,' where the film has been ring rolled in the machine direction;

FIGS. 4*c*-1 and 4*c*-2 depict a second variation of Film 'B,' where the film has been ring rolled first in the machine direction, and subsequently in the transverse direction;

FIGS. 5*a*-1 and 5*a*-2 depict a third example of a film, referred to herein as Film 'C,' suitable for use in constructing one or more discontinuously laminated structures, where the film in FIGS. 5*a*-1 and 5*a*-2 is an un-stretched film;

FIGS. 5*b*-1 and 5*b*-2 depict a first variation of Film 'C,' where the film has been ring-rolled in the machine direction;

FIGS. 5*c*-1 and 5*c*-2 depict a second variation of Film 'C,' where the film has been ring rolled first in the machine direction, and subsequently in the transverse direction;

FIGS. 6*a*-1 and 6*a*-2 depict a fourth example of a film, referred to herein as Film 'H,' suitable for use in constructing one or more discontinuously laminated structures, where the film in FIGS. 6*a*-1 and 6*a*-2 is an un-stretched film;

FIGS. 6*b*-1 and 6*b*-2 depict a first variation of Film 'H,' where the film has been ring rolled in the machine direction;

FIGS. 6*c*-1 and 6*c*-2 depict a second variation of Film 'H,' where the film has first been ring rolled in the machine direction, and subsequently in the transverse direction;

FIGS. 7-1 and 7-2 depict a first example of a discontinuously laminated film structure including a ribbed outer film and a black inner film;

FIGS. 8-1 and 8-2 depict a second example of a discontinuously laminated film structure including a ribbed outer film having white ribs and associated indicia, and a black inner film;

FIGS. 9-1 and 9-2 depict a third example of a discontinuously laminated film structure including a ribbed outer film having white ribs and associated indicia, and a black inner film;

FIGS. 10-1 and 10-2 depict a fourth example of a discontinuously laminated film structure including a ribbed outer film having black ribs and associated indicia, and a white inner film;

FIGS. 11-1 and 11-2 depict a fifth example of a discontinuously laminated film structure including a ribbed outer film having black ribs and associated indicia, and a white inner film;

DETAILED DESCRIPTION

Figure 1:
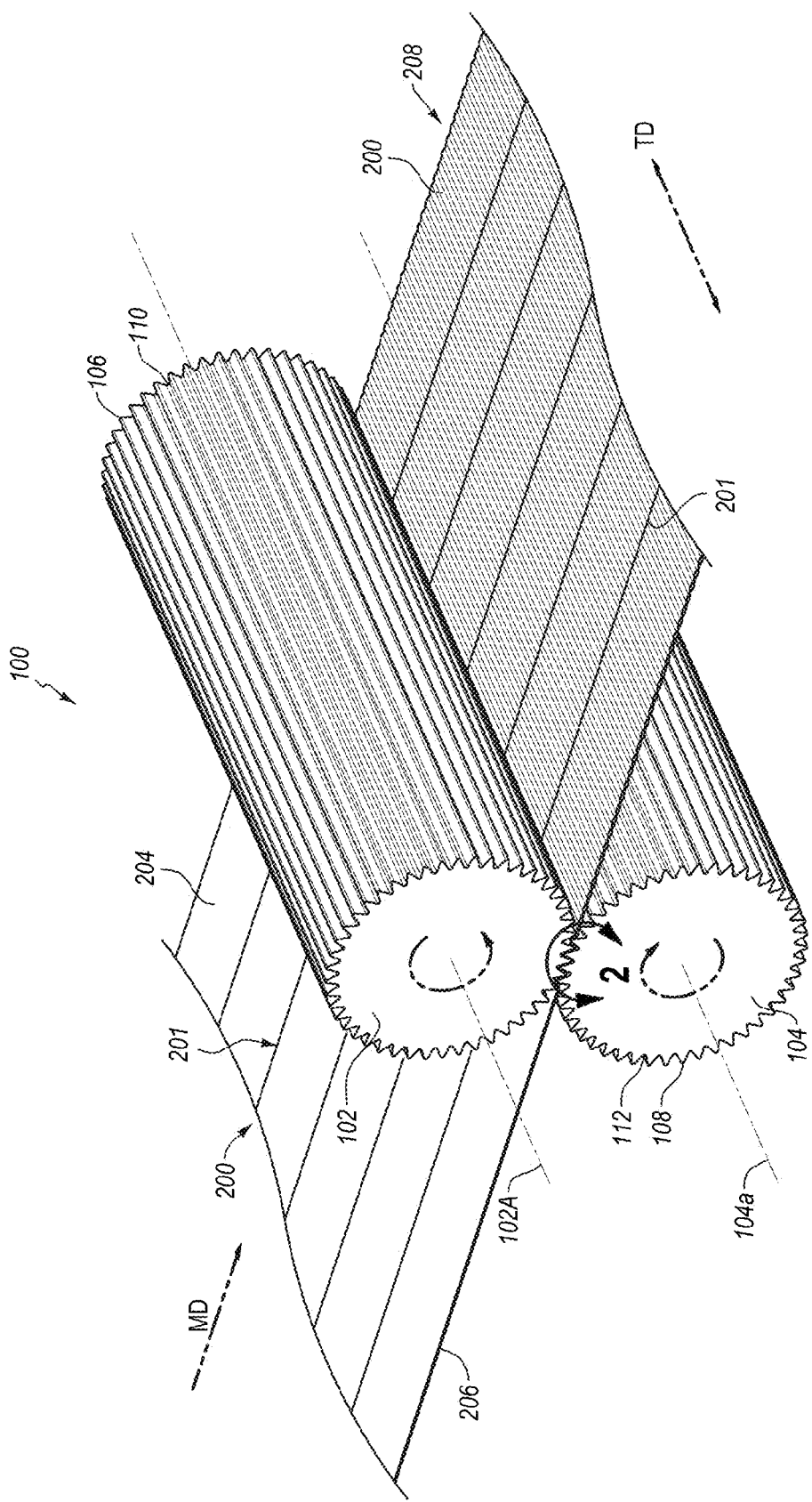
FIG. 1 discloses aspects of an MD machine and associated MD rolling process.

Example embodiments of the invention generally concern laminated polymer film structures. More particularly, at least some embodiments are directed to discontinuously laminated film structures with improved visual characteristics, while other embodiments are directed to methods for producing such discontinuously laminated film structures. The films and discontinuously laminated film structures disclosed herein may be employed in a variety of different end products, examples of which include, but are not limited to, grocery bags, trash bags, sacks, yard waste bags, packaging materials, feminine hygiene products, baby diapers, adult incontinence products, sanitary napkins, bandages, food storage bags, food storage containers, thermal heat wraps, facial masks, wipes, and hard surface cleaners.

A. Aspects of Various Example Embodiments

It should be noted that the embodiments disclosed herein do not constitute an exhaustive summary of all possible embodiments, nor does the following discussion constitute an exhaustive list of all aspects of any particular embodiment(s). Rather, the following discussion simply presents selected aspects of some example embodiments. It should likewise be noted that nothing herein should be construed as constituting an essential or indispensable element of any invention or embodiment. Rather, and as the person of ordinary skill in the art will readily appreciate, various aspects of the disclosed embodiments may be combined in a variety of ways so as to define yet further embodiments. Such further embodiments are considered as being within the scope of this disclosure. As well, none of the embodiments embraced within the scope of this disclosure should be construed as necessarily resolving, or being limited to the resolution of, any particular problem(s). Nor should such embodiments be construed to necessarily implement, or be limited to implementation of, any particular effect(s).

Films and discontinuously laminated film structures within the scope of this disclosure may possess or exhibit a variety of different physical, visual, and/or optical characteristics. The visual and/or optical characteristics may be achieved without the use, for example, of metal layers, color generating laminates, delamination, and/or bending of the film structures. Moreover, such film structures do not require intimate contact between all portions of their films in order to provide such visual and/or optical characteristics.

Illustrative examples of effects such as visual appearances that may be manifest in various embodiments of a discontinuously laminated film structure include: a film with a ribbed outer layer, where a contrast in color and/or color intensity is apparent between the ribs and the webs between the ribs; a two-toned discontinuously laminated film structure with an outer film having silver or metallic webs interposed between white ribs, and a black inner film, such as may be produced by discontinuous lamination of a black inner film with a ribbed precursor film that is clear and has white ribs; a discontinuously laminated film structure with silver, metallic or grey webs interposed between black ribs, such as may be produced by discontinuous lamination of a white inner film with a ribbed precursor film that is clear and has black ribs; and, a discontinuously laminated film structure that includes a coextruded film with an outer layer having black ribs and white webs, and the coextruded film further including a white inner layer. More generally, example discontinuously laminated film structures may include, in any combination, any of the films disclosed in the US Patent applications incorporated by reference herein.

It should be noted that the aforementioned rib, web, and film colors are provided by way of example. Thus, for example, the inner film need not be black, or white, but may be any other color(s), and can be translucent, transparent, or substantially opaque.

As suggested by the foregoing general considerations, discontinuously laminated film structures and products within the scope of this disclosure may include one or more of the following, in any suitable combination: two or more films discontinuously laminated to each other over at least a portion of each film; two or more films discontinuously laminated to each other over at least a portion of each film, one of the films being ribbed and manifesting a contrast in color and/or color intensity between the ribs and webs between the ribs; one or more ribbed films; one or more un-ribbed films; one or more inner films; one or more inner films with a coloring agent; one or more white inner films; one or more black inner films; one or more outer films; one or more outer films with a coloring agent; one or more substantially colorless outer films; one or more ribbed outer films; white ribs; black ribs; one or more plastic films; one or more thermoplastic films; ribs having a coloring agent; ribs having a voiding agent; a first film having a first region of discontinuous lamination with a second film, where a substantial portion of the first region is discontinuously laminated to the second film, and the first film also having a second region where a substantial portion of the second region is in intimate contact with the second film; and, an end product including any of the foregoing films, or combinations of those films.

It will be appreciated from the foregoing, and the other disclosure herein, that a variety of different embodiments may be defined. Some examples of such embodiments are set forth below. Such embodiments are not intended to limit the scope of the invention in any way.

In a first example embodiment, a discontinuously laminated film structure includes a ribbed precursor film laminated together with another film.

In a second example embodiment, a discontinuously laminated film structure includes a ribbed precursor film, one example of which is a coextruded ribbed precursor film, laminated together with another film, and the ribbed precursor film includes a plurality of layers.

In a third example embodiment, a discontinuously laminated film structure includes a ribbed precursor film laminated together with another film, and the ribbed precursor film includes a plurality of layers of LLDPE In a fourth example embodiment, a discontinuously laminated film structure includes an extruded ribbed precursor film laminated together with another film, and the extruded ribbed precursor film exhibits a contrast in color and/or color intensity between the ribs and the webs between the ribs.

In a fifth example embodiment, a discontinuously laminated film structure includes an extruded ribbed precursor film laminated together with another film.

In a sixth example embodiment, a discontinuously laminated film structure includes a ribbed precursor film laminated together with another film, and the ribs of the ribbed precursor film are generally parallel to a machine direction.

In a seventh example embodiment, a discontinuously laminated film structure includes a ribbed precursor film laminated together with another film, and the discontinuously laminated film structure further includes one or more indicia perceptible by one or more senses of a user.

In an eighth example embodiment, a discontinuously laminated film structure includes an extruded ribbed precursor film laminated together with another film, and the discontinuously laminated film structure further includes one or more indicia perceptible by one or more senses of a user.

In a ninth example embodiment, a discontinuously laminated film structure includes a ribbed precursor film laminated together with another film, and the discontinuously laminated film structure further includes one or more indicia visually perceptible by a user.

In a tenth example embodiment, a discontinuously laminated film structure includes a ribbed precursor film laminated together with another film that is colored.

In an eleventh example embodiment, a discontinuously laminated film structure includes a ribbed precursor film laminated together with another film that is black or white.

In a twelfth example embodiment, a discontinuously laminated film structure includes a ribbed precursor film that includes one or both of a stress-sensitive coloring agent and a voiding agent and is laminated together with another film.

In a thirteenth example embodiment, a discontinuously laminated film structure includes a ribbed precursor film that includes a stress-sensitive agent and is laminated together with another film.

In a fourteenth example embodiment, a discontinuously laminated film structure includes an extruded ribbed precursor film that includes a stress-sensitive agent and is laminated together with another film.

In a fifteenth example embodiment, a ribbed precursor film includes a stress-sensitive agent.

In further example embodiments, an end product includes any of the aforementioned discontinuously laminated film structures and/or precursor films.

In a sixteenth example embodiment, a ribbed precursor film is discontinuously laminated together with another film and the resulting discontinuously laminated film structure is stretched.

In a seventeenth example embodiment, a ribbed precursor film is discontinuously laminated together with another film and the resulting discontinuously laminated film structure is stretched in one or both of an MD direction and a TD direction.

In an eighteenth example embodiment, a ribbed precursor film is discontinuously laminated together with another film and the resulting discontinuously laminated film structure is stretched first in an MD direction and then in a TD direction.

In a nineteenth example embodiment, a ribbed precursor film is folded and stacked on another folded film, and the stack is ring rolled, the ring rolling including MD or TD ring rolling, in any order.

In a twentieth example embodiment, a ribbed precursor film is folded and stacked on another folded film, and the stack is ring rolled, the ring rolling including MD or TD ring rolling, in any order, and then one film is inserted into the other film, and the resulting book structure is ring rolled, the ring rolling of the book structure including MD or TD ring rolling, in any order, In a twenty first example embodiment, a ribbed precursor film is folded and stacked on another folded film, and the stack is ring rolled, the ring rolling including MD or TD ring rolling, in any order, and then one film is inserted into the other film, and the resulting book structure is ring rolled, the ring rolling of the book structure including MD or TD ring rolling, in any order, and any of the ring rolling processes can be hot or cold processes.

In a twenty second example embodiment, a ribbed precursor film is discontinuously laminated together with another film and the resulting discontinuously laminated film structure is stretched so as to produce one or more indicia perceptible by a user.

In a twenty third example embodiment, a ribbed precursor film including a stress-sensitive agent is discontinuously laminated together with another film and the resulting discontinuously laminated film structure is stretched such that a change involving the stress-sensitive agent is perceptible by a user.

In a twenty fourth example embodiment, a ribbed precursor film is discontinuously laminated together with another film and the resulting discontinuously laminated film structure is subjected to further processing which produces indicia in the discontinuously laminated film structure.

In further example embodiments, any of the aforementioned processes used in whole or in part to produce an end product that includes any of the aforementioned discontinuously laminated film structures and/or precursor films.

For purposes of this disclosure and claims, the term "rib" embraces a portion of extra resin on a surface of a given precursor film, which portion is an integral portion of the film, and before any subsequent hot or cold forming process on the film, such as a ring rolling process. The "rib," e.g., reference 201 in FIG. 1 of a ribbed film, e.g., reference 200 in FIG. 1, may be formed in accordance with implementations of the present invention via extrusion of molten resin through an appropriate die having one or more sets of grooves for forming corresponding ribs. Similarly, for purposes of this description and claims, a "ribbed film" refers to a film that has been extruded in molten form with one or more ribs, and therefore comprises the one or more extruded ribs independent of any other striations or rib-like formations that may occur via any other hot or cold forming process after the initial extrusion/formation of the rib(s) of the ribbed film. Such other striations or rib-like formations from subsequent forming processes are referred to herein generally as "ripples(s)." See, for example, reference 208 of FIGS. 1 and 2a.

In terms of the physical configuration of a "rib," the scope of the invention is not limited to any particular form, size or orientation thereof. In general however, the ribs extend outwardly a distance from a surface of the film. In this structure, a web is defined between consecutive ribs. The ribs may or may not have a generally triangular cross-section, but it will be appreciated that, for example, an extrusion die can be configured to produce a rib having any desired cross-sectional shape.

B. Discontinuously Laminated Films and Film Structures

As contemplated herein, discontinuously laminated structures and discontinuous lamination processes embrace, among other things, lamination of two or more films where the lamination is not continuous, that is, the lamination is discontinuous, in one or more directions. Such directions may include, for example, one or both of the machine direction (MD), and the transverse direction (TD) which is generally orthogonal to the MD. More particularly, discontinuous lamination includes lamination of two or more films with repeating bonded patterns broken up by repeating un-bonded areas in one or both of the machine direction and the transverse direction of the film.

As used herein, the term "machine direction" or "MD" refers to the direction along the length of the film, or in other words, the direction of the film as the film is formed during extrusion and/or coating. Likewise, the term "transverse direction" or "TD" refers to the direction across the film or perpendicular to the machine direction. Finally, the term "diagonal direction" or "DD" refers to the direction that is not aligned with either the length or the width of the film.

A wide variety of films and discontinuously laminated film structures may be employed to achieve various desired visual characteristics and/or physical characteristics, such as tactile characteristics. An illustrative example of a discontinuously laminated film structure includes at least two films, or portions thereof, that are discontinuously laminated to each other. That is, the two films cooperatively define both regions of intimate contact between the adjacent films, and regions of non-intimate contact between the adjacent films. The two or more films may include a ribbed film that is discontinuously laminated to a film that includes a coloring agent and is un-ribbed. One or more of the films of a discontinuously laminated film structure may be plastic or other flexible material(s). As well, one or more films of a discontinuously laminated film structure may be a coextruded, ribbed film, although other example films may be ribbed films may be used that are not produced by coextrusion. Thus, the scope of the invention is not limited to any particular type of ribbed film.

It should be noted that in addition to being implemented together with one or more other films to form a discontinuously laminated film structure, one or more of the ribbed films and other films included in the discontinuously laminated film structure may, themselves, also have a discontinuously laminated structure. Accordingly, discontinuously laminated film structures which include, as one of their films, a film that itself has a discontinuously laminated structure, are considered to fall within the scope of the invention.

C. Example Film Materials

The discontinuously laminated film structures and their constituent films may comprise any flexible or pliable material, including thermoplastic materials that can be formed or drawn into a film. As described above, discontinuously laminated film structures within the scope of the invention include a plurality of films, one or more of which may be thermoplastic. Each individual film may itself include a single layer or multiple layers. Adjuncts may also be included, as desired. Examples of such adjuncts include coloring agents such as pigments, dyes, and dilute pigments, slip agents, voiding agents, anti-block agents, tackifiers, and combinations of the foregoing.

The thermoplastic material of the films of one or more implementations can include, but are not limited to, thermoplastic polyolefins, including polyethylene, polypropylene, and copolymers thereof. Besides ethylene and propylene, exemplary copolymer olefins include, but are not limited to, ethylene vinylacetate (EVA), ethylene methyl acrylate (EMA) and ethylene acrylic acid (EAA), or blends of such olefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber, and combinations of the foregoing.

D. General Aspects of Some Example Production Processes

Consistent with the varied natures of films and associated discontinuously laminated film structures, various processes, and combinations thereof, may be used in the production of the films and discontinuously laminated film structures disclosed herein. Examples of such processes include, but are not limited to, heat bonding, ultrasonic bonding, adhesive bonding, incremental stretching, pressure bonding techniques such as machine direction (MD) ring rolling, transverse direction (TD) ring rolling, diagonal direction (DD) ring rolling, and any ring rolling process that results in the formation of a laminated film with strainable networks. Treatment with a corona discharge may be used to enhance any of the aforementioned methods. Prior to lamination, the separate films can be flat film or can be subject to separate processes, such as stretching, slitting, coating and printing, and corona treatment.

More generally however, any other process(es) that produces laminated films that cooperate to define regions of intimate contact between adjacent films, and regions of non-intimate contact between adjacent films, may be employed, and the scope of the invention is not limited to any particular production process(es). Moreover, and as noted above, various of the foregoing bonding techniques can be combined to create a film and/or discontinuously laminated film structures. By way of illustration, pressure and heat bonding processes can be combined, either simultaneously or serially, to form a film and/or discontinuously laminated film structure.

Consistent with this disclosure, manufacturers may form individual films to be discontinuously laminated together so as to provide improved strength characteristics using a wide variety of techniques. For example, a manufacturer can form a precursor mix of the thermoplastic material including any optional additives. The manufacturer can then form the film(s) from the precursor mix using conventional flat extrusion, cast extrusion, or coextrusion to produce monolayer, coextruded bilayer, or multilayered films. In any case, the resulting film will be discontinuously bonded to another film at a later stage. Alternative to conventional flat extrusion or cast extrusion processes, a manufacturer can form the films using other suitable processes, such as, a blown film process to produce monolayer, bilayer, or multilayered films, which are subsequently discontinuously laminated with another film at a later stage. If desired for a given end use, the manufacturer can orient the films by trapped bubble, tenterframe, or other suitable processes. Additionally, the manufacturer can optionally anneal the films.

Where extrusion is employed, a manufacturer can use multiple extruders to supply different melt streams, which a feed block can order into different channels of a multi-channel die. The multiple extruders can allow a manufacturer to form a multi-layered film with films having different compositions. Such multi-layer film may later be discontinuously laminated with another film, which may or may not be multi-layer itself, to provide a discontinuously laminated film structure.

In a blown film process, the die can be an upright cylinder with a circular opening, and the die may include geometric features about its internal diameter that can form various structures on the film. As disclosed elsewhere herein, one example of such a geometric feature is a set of teeth disposed about the internal diameter of the die which may cause the formation of ribs on the film as the molten plastic is passed through the die. With continuing reference to the blow film process, rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio may be referred to as the "blow-up ratio," or BUR. When using a blown film process, the manufacturer can collapse the film to double the plies of the film. Alternatively, the manufacturer can cut and fold the film, or cut and leave the film unfolded.

A more detailed discussion of various specific examples of production processes that may be used in the production of the discontinuously laminated film structures disclosed herein is set forth below.

E. Example Production Equipment

Figure 2A:
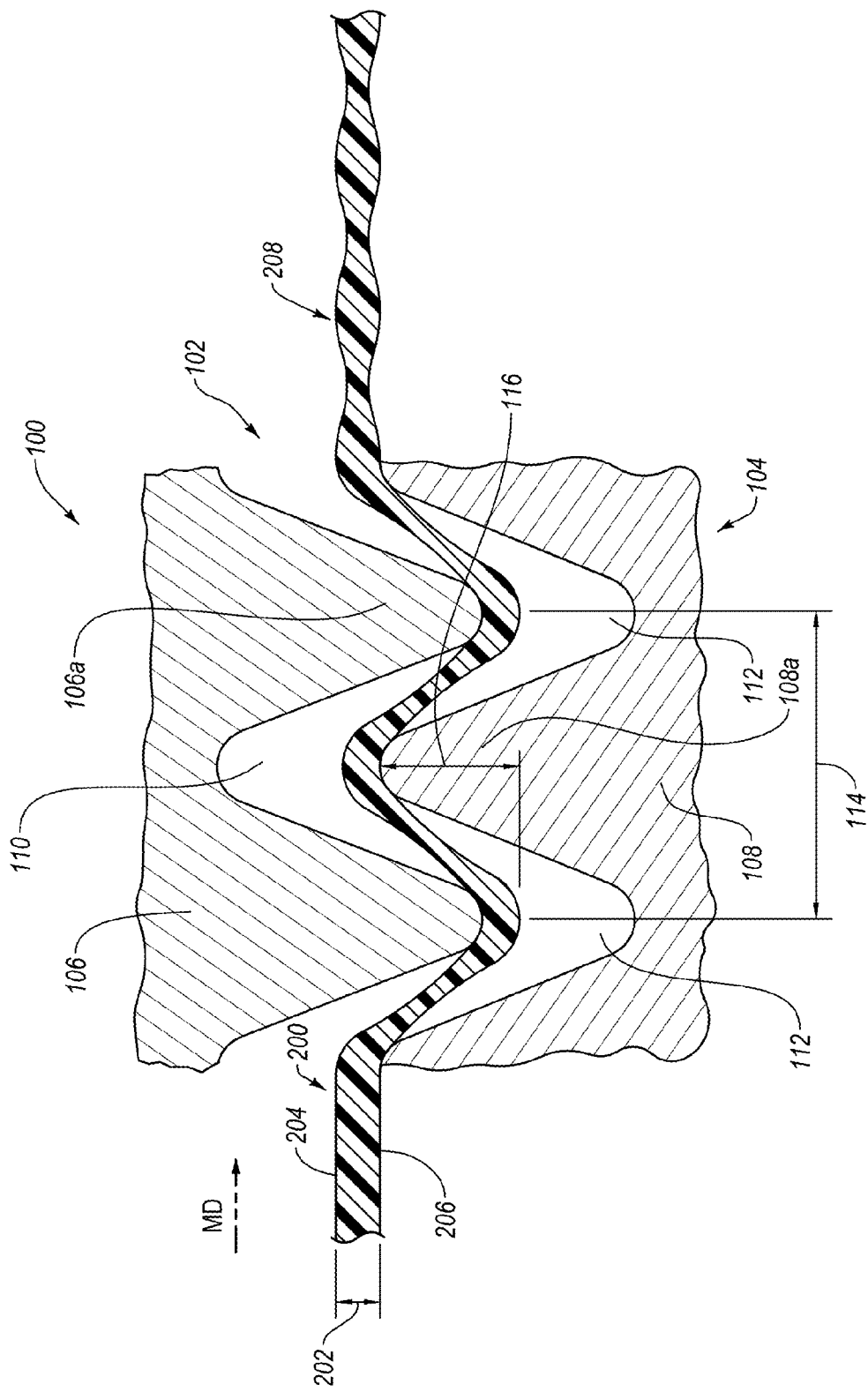
FIG. 2*a* is another detail view illustrating the formation of indicia on a portion of a film, a rib in this case, by a tool such as a ring roller.
Figure 2B:
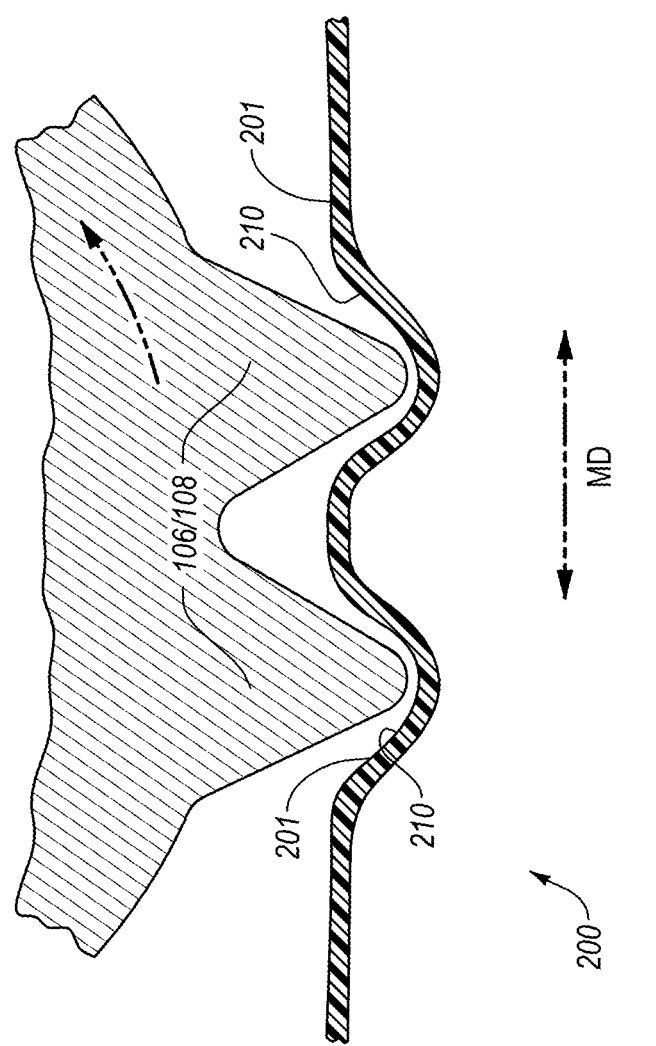
FIG. 2*b* is a detail view of the MD machine of FIG. 1, and discloses aspects of the operation of the MD machine relative to a film.
Figures 1, 3A:
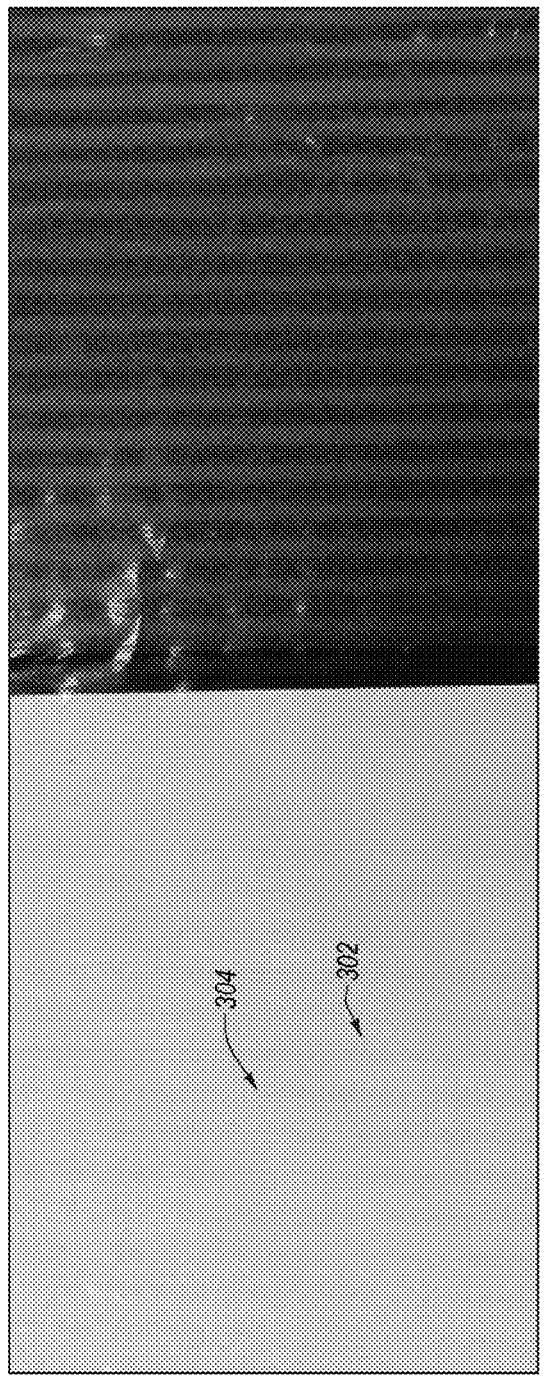
Figures 2, 3A:
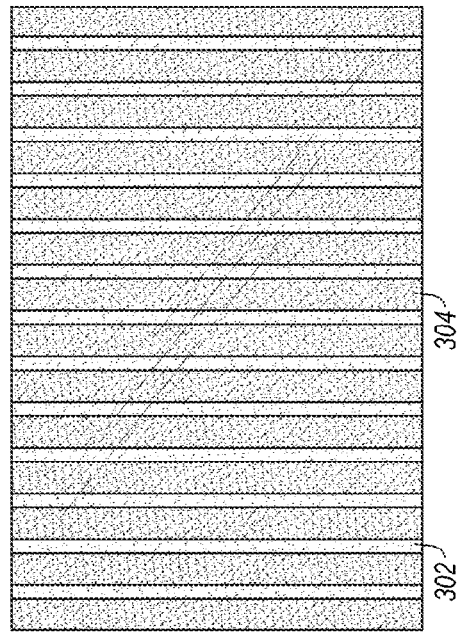
Figures 1, 3B:
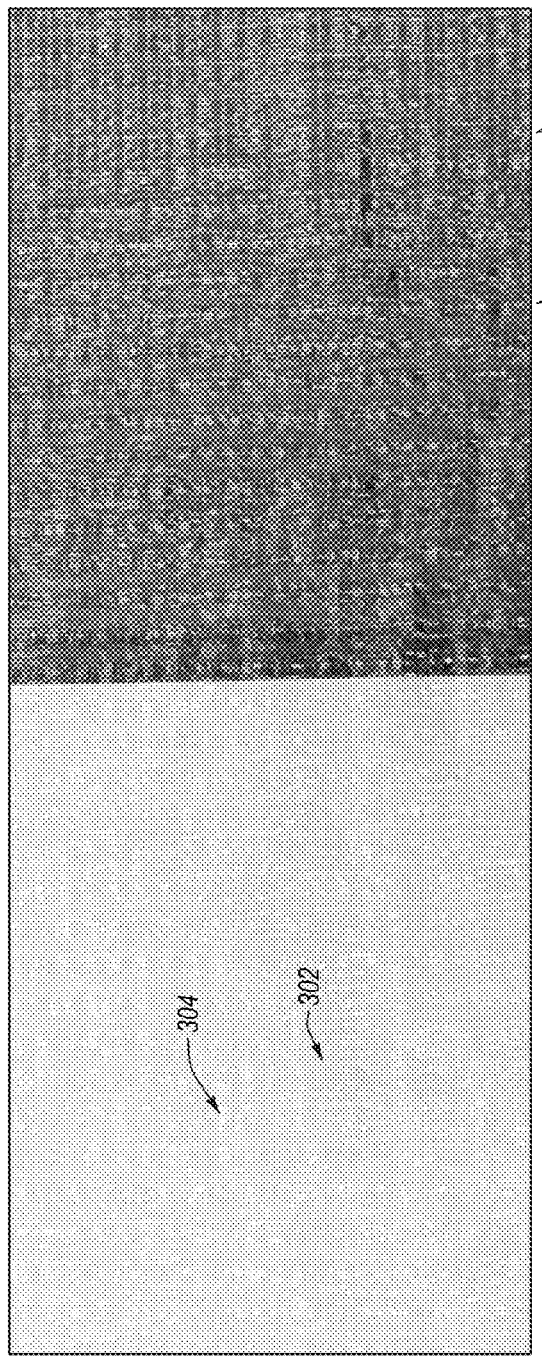
Figures 2, 3B:
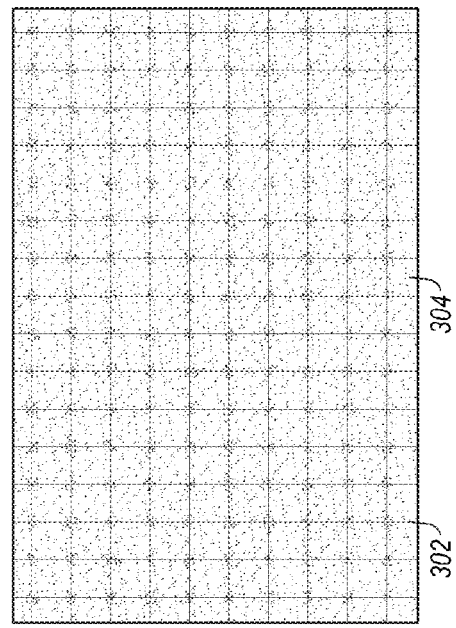
Figures 1, 3C:
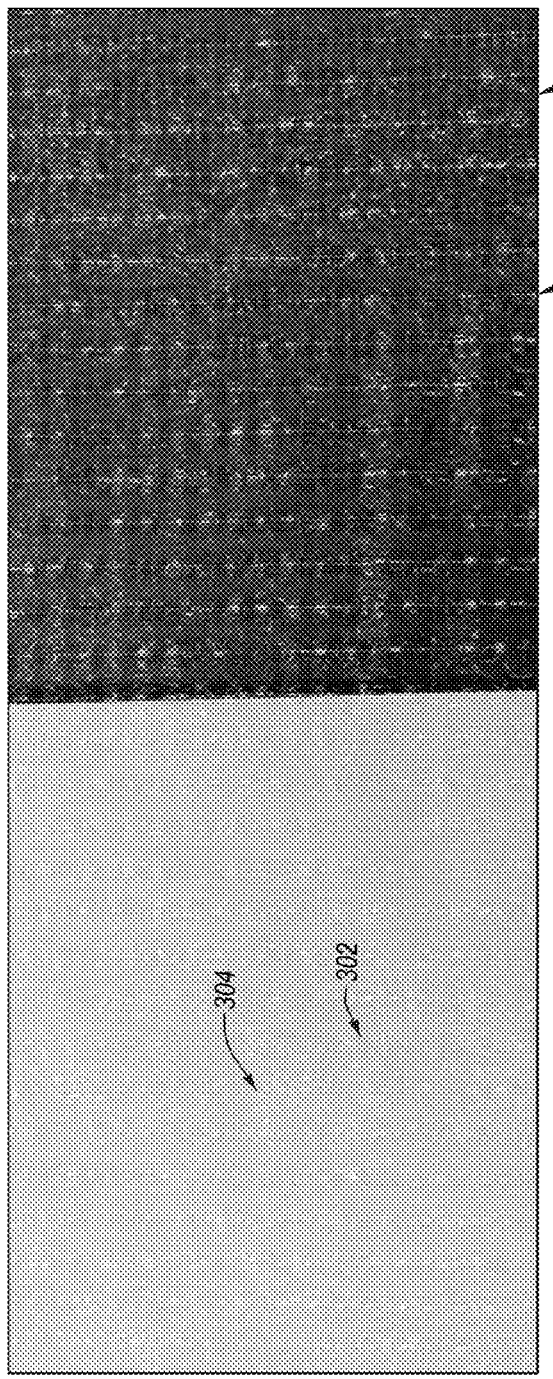
Figures 2, 3C:
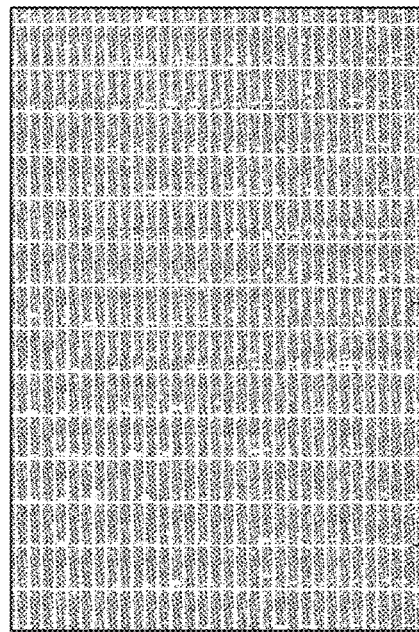

With reference now to FIGS. 1-2b, details are provided concerning aspects of a machine 100 that may be employed in conjunction with a film, such as film 200 for example, to produce one or more of the ribbed films disclosed herein.

With regard initially to a film, the example film 200 may be a multi-layered film and may comprise any of the materials disclosed herein. For example, the film 200 may comprise two or more individual layers (not specifically shown in FIGS. 1 and 2a), such as a ribbed precursor layer and other layers. The individual layers of the multi-layer film 200 may each be formed in whole or in part, by extrusion, for example. Moreover, a ribbed precursor film may include ribs 201 formed by an extrusion process, that is, extruded ribs. As indicated in FIG. 1, the ribs 201 may extend generally parallel to the machine direction, but that is not required.

In any case, the film 200 can have an initial thickness or starting gauge 202 defined by the distances between its top 204 and bottom surfaces 206. In at least one embodiment, the starting gauge 202, as well as the respective gauges of the individual layers can be substantially uniform along the length of the film 200.

With regard now to the machine 100, FIGS. 1 and 2a disclose portions of a machine 100 that can implement an MD ring rolling process that partially discontinuously laminates individual adjacent layers of film 200 by passing the film 200 through a pair of MD intermeshing rollers 102 and 104. As a result of MD ring rolling, the film 200 is also intermittently stretched in the machine direction MD.

For example, FIG. 1 discloses that the first roller 102 and the second roller 104 can each have a generally cylindrical shape, and are operable to rotate in opposite directions about respective parallel axes of rotation 102a and 104a that may be generally parallel to the transverse direction TD and generally perpendicular to the machine direction MD. The rollers 102 and 104 each include a respective plurality of radially protruding ridges 106 and 108 that extend along the respective rollers 102 and 104 in a direction generally parallel to the axes of rotation 102a and 104a. The respective tips 106a and 108a of ridges 106 and 108 can have a variety of different shapes and configurations, including the rounded shape as shown in FIG. 2a. In alternative implementations, the tips 106a and 108a of the ridges 106 and 108 can have sharp angled corners. As further indicated in FIGS. 1 and 2a, the ridges 106 are separated by grooves 110, while the ridges 108 are separated by grooves 112.

In at least one implementation, the ridges 106 and 108 are staggered relative to each other so that the grooves 110 can receive at least a portion of the ridges 108 as the rollers 102 and 104 intermesh with each other. Correspondingly, the grooves 112 can receive at least a portion of the ridges 106. In at least some instances, the configuration of the ridges 106 and 108 and grooves 110 and 112 can prevent substantial contact between ridges 106 and 108 during intermeshing such that little or no rotational torque is transmitted during operation. Additionally, the configuration of the ridges 106 and 108, and of the grooves 110 and 112, can affect the amount of stretching and the bond strength resulting from partially discontinuous lamination as the film passes through the rollers 102 and 104.

With continued reference to FIGS. 1 and 2a, the pitch and depth of engagement of the ridges 106 and 108 can determine, at least in part, the amount of incremental stretching and partially discontinuous lamination caused by the intermeshing rollers 102 and 104. As shown in FIG. 2a, the pitch 114 is the distance between the tips of two adjacent ridges on the same roller. The depth of engagement (DOE) 116 is the amount of overlap between adjacent ridges 106 and 108 of the rollers 102 and 104 during intermeshing.

As is evident from the foregoing, various parameters of the machine 100 may be selected and implemented depending upon the effect(s) desired to be achieved. For example, the ridge pitch and/or DOE may be varied as necessary. Merely because these parameters, and others, may be varied however, such variations will not necessarily be evident to one of ordinary skill in the art, and may, in some instances at least, be arrived at only after substantial experimentation and trials.

As indicated in FIGS. 1 and 2a, the direction of travel of the film 200 through the intermeshing rollers 102 and 104 is generally parallel to the machine direction and generally perpendicular to the transverse direction. As the multi-layered film 200 passes between the intermeshing rollers 102 and 104, the ridges 106 and 108 incrementally stretch the film 200 in the machine direction. In one or more implementations, stretching the film 200 in the machine direction can reduce the gauge of the film and increase the length of the film 200. In other implementations, the film 200 may rebound after stretching such that the gauge of the film 200 is not substantially decreased. Furthermore, in one or more implementations, stretching the film 200 in the machine direction can reduce the width of the film 200. For example, as the film 200 is lengthened in the machine direction, the width of the film 200 can be reduced in the transverse direction.

In particular, and as best shown in FIG. 2a, as the film 200 proceeds between the intermeshing rollers 102 and 104, the ridges 106 of the first roller 102 can push film 200 into the grooves 112 of the second roller 104, and the ridges 108 of the second roller 104 can also push the film 200 into the grooves 110 of the first roller 102. The pulling of the film 200 by the ridges 106 and 108 can stretch the film 200. However, the rollers 102 and 104 need not necessarily stretch the film 200 evenly along its length. Specifically, the rollers 102 and 104 can stretch the portions of the film 200 between the ridges 106 and 108 more than the portions of the film 200 that contact the ridges 106 and 108, as indicated in FIG. 2a.

Thus, the rollers 102 and 104 can cooperate to form a series of machined ripples 208 in the film 200 such that the film 250 includes relatively thicker portions alternating with relatively thinner portions. As indicated in FIG. 1, the ripples 208 in this particular example are disposed generally parallel to the transverse direction. In this example then, the ripples 208 are generally orthogonal to the ribs 201, but such an arrangement is not required. Thus, the finished film 200 may be a rippled film of multi-layer, or single layer, construction. Moreover, the finished film 200 may, in at least some embodiments, have a laminated structure, although such a structure is not required nor implemented in every case. As disclosed elsewhere herein, various desirable visual effects and characteristics may be achieved through selection and processing of various films that make up a multi-layer implementation of the film 200.

Directing attention now to FIG. 2b, and with continuing attention to FIG. 2a, details are provided concerning aspects of an example machine and process which may be useful in creating various indicia on a film, such as a ribbed film for example. In particular, it can be seen that when an MD ring rolling process, for example, is performed on the example film 200, the ridges 106 and 108 may temporarily or permanently compress portions of the ribs 201. The compressions 210 may, but need not, be generally orthogonal to the direction of the ribs 201.

It will be appreciated that the compressions 210 of the ribs 201 constitute one example of indicia, discussed in more detail elsewhere herein. The color, size, number, geometry and orientation of the compressions 260 may depend on one or more of the particular ring rolling process performed, roller pitch, DOE, material(s) of the film, and pigments and/or voiding agents present in one or more films.

A stretching process such as MD ring rolling is one example of method suitable to implement partially discontinuous lamination of a film, such as a multi-layer film for example, by incremental stretching of the film in the machine direction. A stretching process such as TD ring rolling is another suitable method of discontinuously or partially discontinuously laminating a film such as a multi-layer film for example, by incremental stretching of the film in the transverse direction. Stretching processes such as TD ring rolling and MD ring rolling, may be used together, alone, or in conjunction with other processes. While not specifically illustrated, a TD ring rolling machine and associated process may be similar, respectively, to the MD ring rolling machine and associated process, though the rollers of a TD ring rolling machine include ridges and grooves that extend generally parallel to the MD direction, rather than orthogonal to the MD direction, as in the case of an MD machine and process. Thus, a TD ring rolling process may produce a film having corrugations that are generally parallel to the MD direction.

F. Example Films

In general, there are a variety of films that may be employed in the formation of discontinuously laminated film structures and, accordingly, it should be understood that the embodiments of films and discontinuously laminated film structures set forth in the Figures, and discussed herein, are presented solely by way of illustration and are not intended to limit the scope of the invention in any way. The example films discussed below are ribbed films that may be produced in a variety of different ways. In addition to a visually appealing appearance, such ribs may provide a structure that deforms, thereby producing indicia, when subjected to various stretching processes, such as DD, MD, and TD ring rolling. As noted elsewhere herein, variables such as pitch of ribs, DOE, and/or RR teeth can be adjusted to provide desirable visual effects in the film.

F.1 Example Film 'A'

FIGS. 3a-1 through 3d-2 and the corresponding text provide details concerning an example ribbed film laminate structure referred to herein as Film 'A.' In FIGS. 3a-1, 3b-1, 3c-1 and 3d-1, the left-side portion of the film is shown on a white background, and the right-side portion of the film is shown on a black background, to better disclose various aspects of the film. The same is likewise true of FIGS. 4a-1, 4b-1, 4c-1, 5a-1, 5b-1, and 5c-1. In FIGS. 6a-1, 6b-1 and 6c-1, only a black background is used.

In this particular example, Film 'A' is an extruded film that comprises three layers of linear low-density polyethylene (LLDPE), having a layer structure of A:B:A, wherein the layer ratio for the three layers is about 20:60:20. That is, the outer two layers, or skin layers, each have a thickness of about 20 percent of the total thickness of Film 'A', while the core layer has a thickness of about 60 percent of the total thickness of Film 'A'.

FIGS. 3a-1 through 3d-2 further show that both the core layer and the skin layers are un-pigmented. The ribs of Film 'A' averaged about 6.5 mils tall, with an average spacing between extruded ribs 302 of about 0.336 inches. The thickness of the web 304 between consecutive extruded ribs 302 was targeted to be about 0.50 mils thick. As indicated in the Figures, the extruded ribs 302 appear translucent as a result of their relative thickness, and as a result of its thinness, the web 304 between the extruded ribs 302 appears to be nearly colorless.

With particular reference first to FIGS. 3a-1 and 3a-2, an embodiment of Film 'A' is disclosed that reflects an absence of post-extrusion processing, such as MD or TD ring rolling. As illustrated, the ribs 302 have a hazy appearance, and the web 304 between the ribs 302 is largely translucent.

FIGS. 3b-1, 3b-2, 3c-1 and 3c-2 further disclose that different effects can be achieved in, for example, the appearance and/or feel of a ribbed film by varying the post-extrusion tools and/or processing employed in connection with the film. Such tools and/or processing can include one or more of DOE, tooth pitch, tooth shape, and ring rolling including one or more of TD, MD and DD ring rolling. To illustrate, FIGS. 3b-1, 3b-2, 3c-1 and 3c-2 disclose an implementation in which Film 'A' was stretched by an MD process using a 200 pitch tool and a DOE of about 150 mils. MD stretching with these parameters resulted in the web 304 having a hazier appearance, relative to the un-stretched embodiment of FIGS. 3a-1 and 3a-2, while the ribs 302 experienced no substantial change in color or haze. This is particularly apparent when referring to the right hand side of FIGS. 3a-1, 3a-2, 3b-1 and 3b-2, where Film 'A' is disposed on a black background.

Figures 1, 3D:
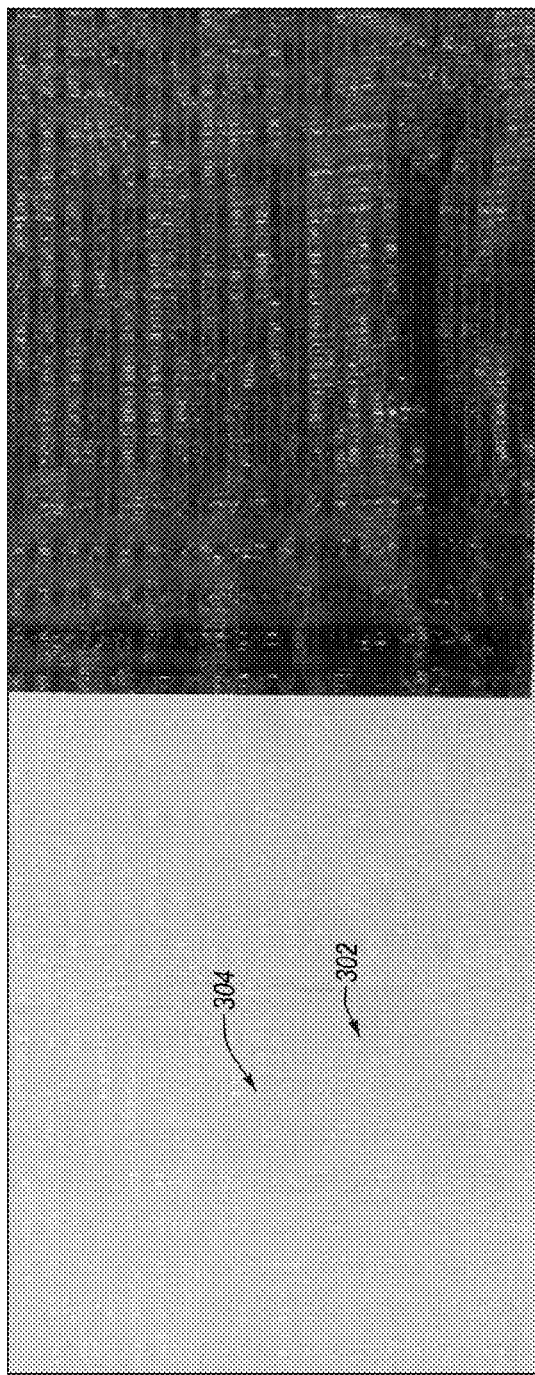
Figures 2, 3D:
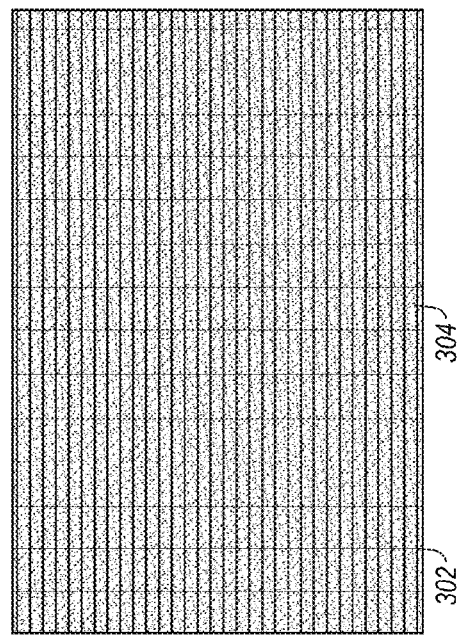

FIGS. 3d-1 and 3d-2 disclose the embodiment of FIGS. 3b-1, 3b-2, 3c-1 and 3c-2 after that embodiment was further subjected to a TD ring rolling process with a 40 pitch tool and DOE of about 20 mils. The additional TD ring rolling process produced no substantial change in the haze of the web 304 between the ribs 302. Similarly, this process produced no substantial color change in the extruded ribs 302 or web 304 between the extruded ribs 302.

F.2 Example Film 'B'

Figures 1, 4A:
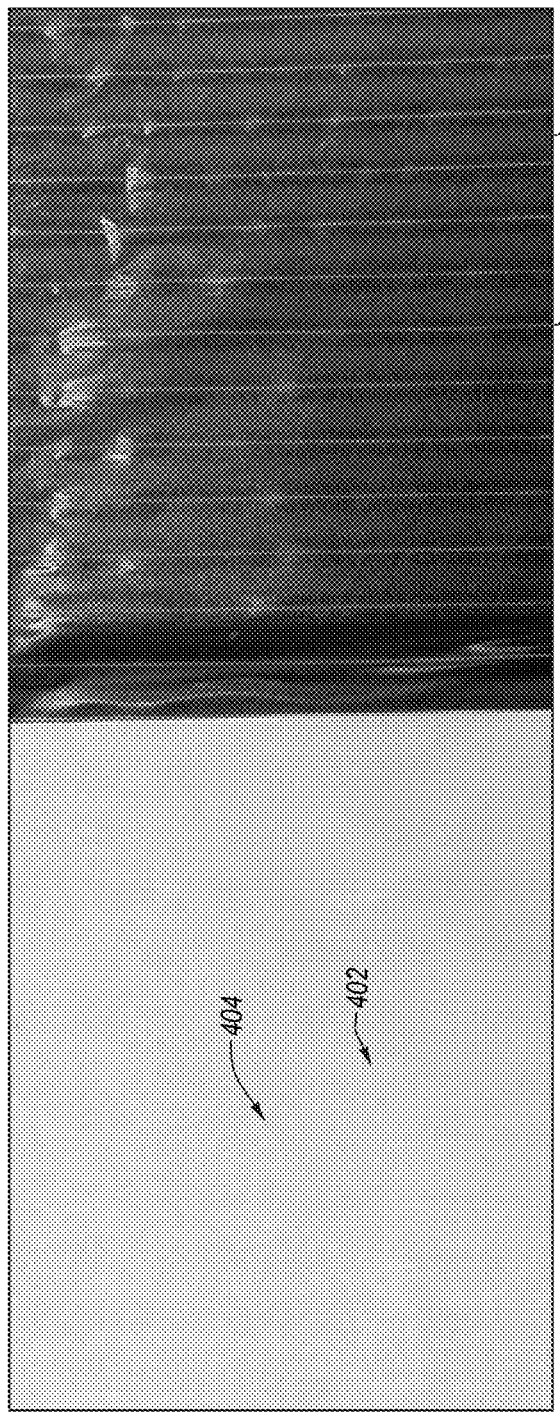
Figures 2, 4A:
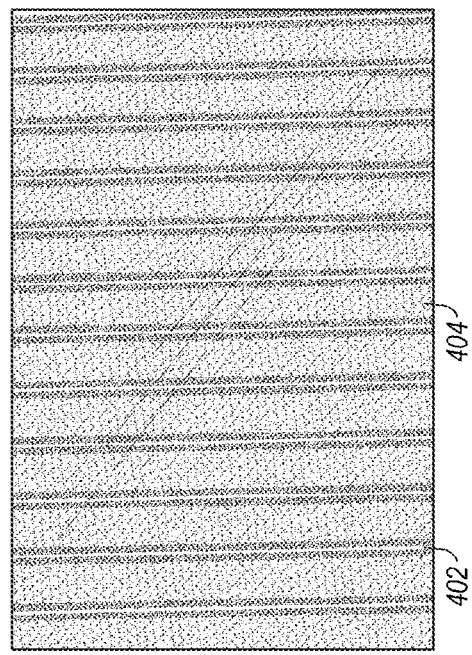

FIGS. 4a-1 and 4a-2 disclose aspects of another film referred to herein as Film 'B,' before any ring rolling, such as TD or MD ring rolling, has been performed. Similar to Film 'A,' Film 'B' is an extruded, ribbed film laminate structure that comprises three layers of linear low-density polyethylene (LLDPE) having a layer structure of A:B:A, where the layer ratio for the three layers is about 20:60:20.

In this example, the core layer (or 'B' layer of the A:B:A structure) is un-pigmented, but in contrast with Film 'A,' the skin layers contain about 20 percent calcium carbonate ($CaCO_3$) masterbatch, a voiding agent. As in the case of Film 'A', the ribs 402 of Film 'B' average about 6.5 mils tall, with an average spacing between ribs 402 of about 0.336 inches. The thickness of the web 404 between the ribs 402 was targeted to be about 0.50 mils thick. The example of FIG. 4a indicates that, absent any ring rolling, the ribs 402 of Film 'B' have a hazy translucent appearance due to the presence of the $CaCO_3$ and the thickness of the ribs 402, while the web 404 between the ribs 402 was hazy but nearly colorless.

Figures 1, 4B:
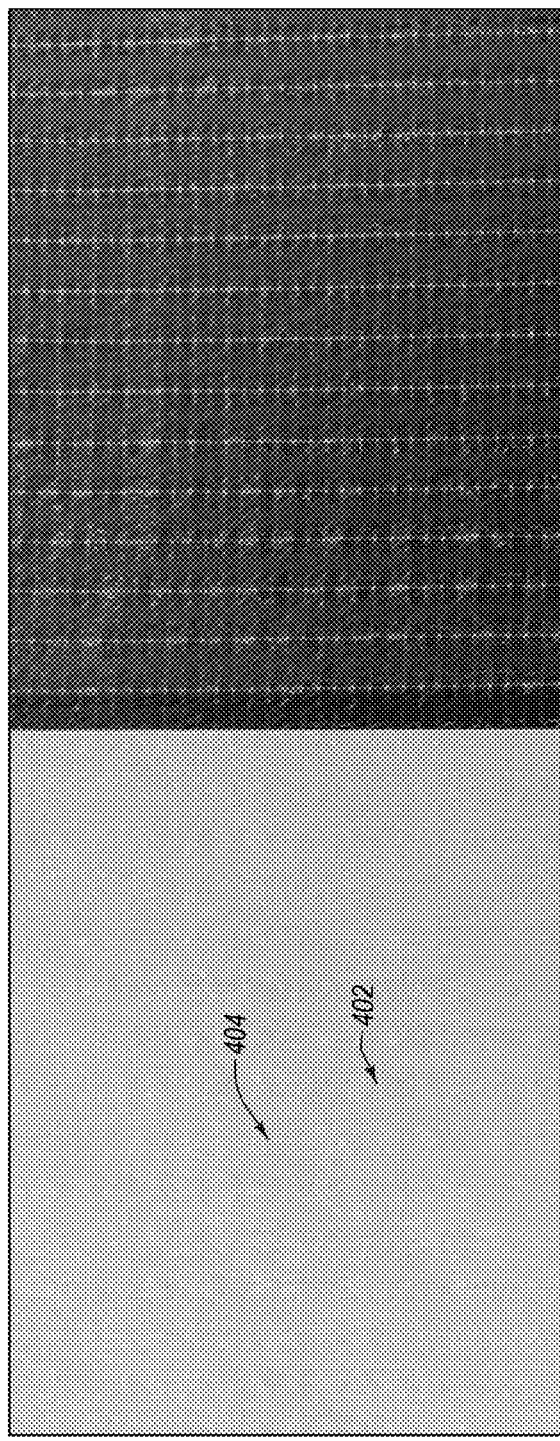
Figures 2, 4B:
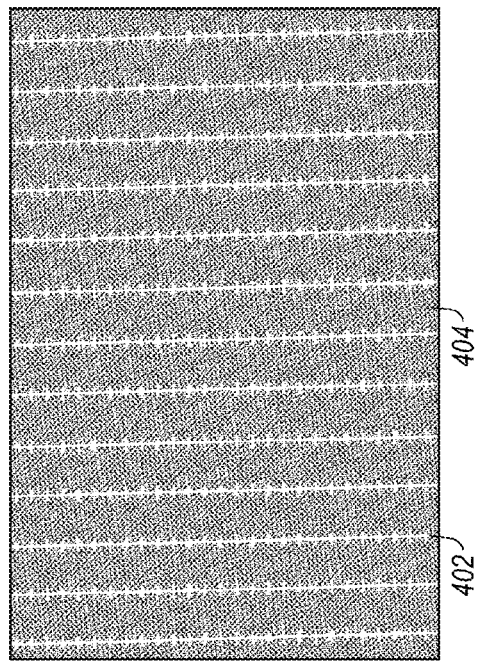

FIGS. 4b-1 and 4b-2 indicate the effect on Film 'B' of the performance of an MD ring rolling process. In particular, FIG. 4b illustrates the effect on Film 'B' after application of an MD ring rolling process using a 200 pitch tool and a DOE of about 150 mils. As shown in that Figure, MD ring rolling and consequent stretching of Film 'B' under these parameters resulted in a relatively hazier appearance of the web 404 between the ribs 402, while the ribs 402 took on a visibly enhanced white color. FIGS. 4b-1 and 4b-2 further show that the ribs 402 each comprise a white "stitch" or cross pattern that intermittently crosses each rib 403. This is particularly apparent when referring to the right hand side of FIGS. 4b-1 and 4b-2, where Film 'B' is disposed on a black background. The "stitch" patterns are areas in which the MD rollers stress that particular area of the rib 402, causing the voiding agent, which is stress-sensitive, to react and produce areas of enhanced whiteness along the ribs 402. As in the case of Film 'A' in FIGS. 3a-1 through 3c-2, however, the stretching resulting from the TD ring rolling process has no such effect on the MD ring rolled Film 'B.' As discussed in more detail below, the aforementioned stitches are one example of indicia that may be produced in connection with various embodiments.

Figures 1, 4C:
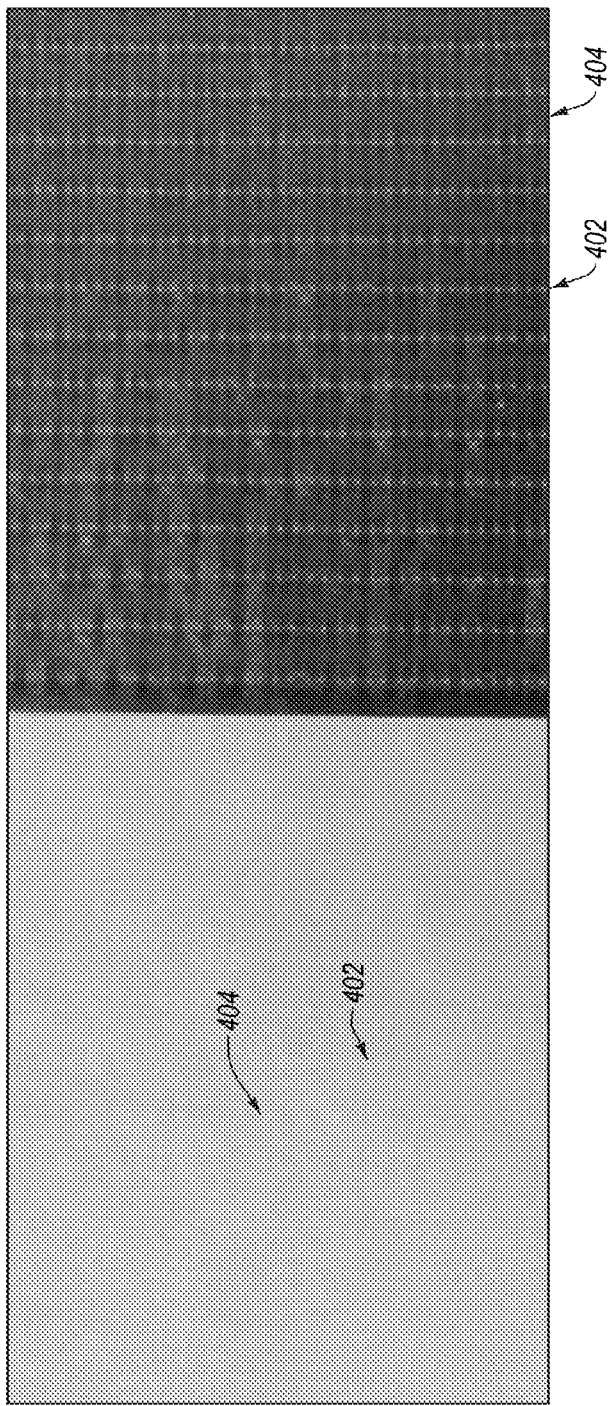
Figures 2, 4C:
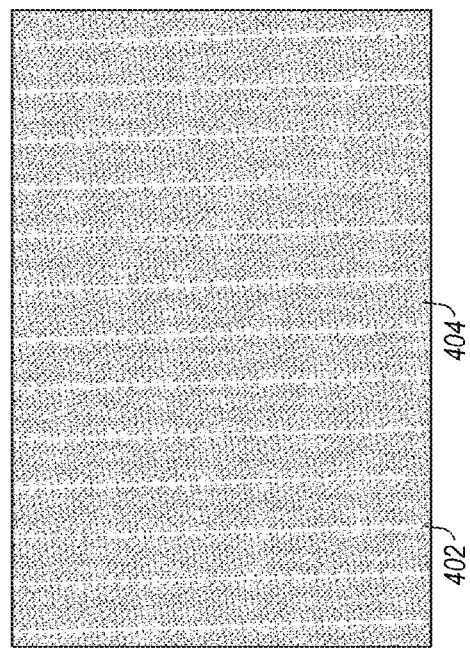

Notably, FIGS. 4c-1 and 4c-2 illustrate Film 'B' after the application, to the film of FIGS. 4b-1 and 4b-2, of a TD process using a 40 pitch tool and a DOE of about 20 mils. As indicated, that TD process produced no significant change in the ribs 402, or in web 404.

F.3 Example Film 'C'

FIGS. 5a-1 through 5c-2 provide details concerning another example ribbed film, referred to herein as Film 'C.' In this particular example, Film 'C' is an extruded ribbed film that comprises three layers of linear low-density polyethylene (LLDPE), having a layer structure of A:B:A, wherein the layer ratio for the three layers is about 20:60:20. As in the case of Films 'A' and 'B,' discussed above in connection with FIGS. 3a-1 through 4c-2, the ribs 502 of Film 'C' average about 6.5 mils tall, with an average spacing between ribs 502 of about 0.336 inches. The thickness of the web 504 between the ribs 502 was targeted to be about 0.50 mils thick.

In contrast with Film 'B,' however, Film 'C' comprises a black coloring agent that causes the ribs 502 to appear black. Specifically, Film C comprises a core layer (layer B of layer structure A:B:A) that was un-pigmented, albeit with skin layers (layers A of structure A:B:A) that contained a dilute pigment, about 0.5 percent black masterbatch in this example. By way of explanation, Applicants have found that a dilute pigment having a concentration in the range of about 0.25 percent to about 3.0 percent may provide acceptable results in this and/or other embodiments. Applicants have also found that concentrations in a range of about 0.25 percent to about 2.0 percent may be useful in some instances, and concentrations in a range of about 0.25 percent to about 1.0 may be particularly useful in some instances.

With particular reference to FIGS. 5*a*-1 and 5*a*-2, which disclose an un-stretched version of Film 'C,' the ribs 502 appear black due to their thickness and the presence of the black masterbatch. Due to its relative thinness, the web 504 between the ribs 502 can appear to be nearly colorless to slightly hazy.

Figures 1, 5B:
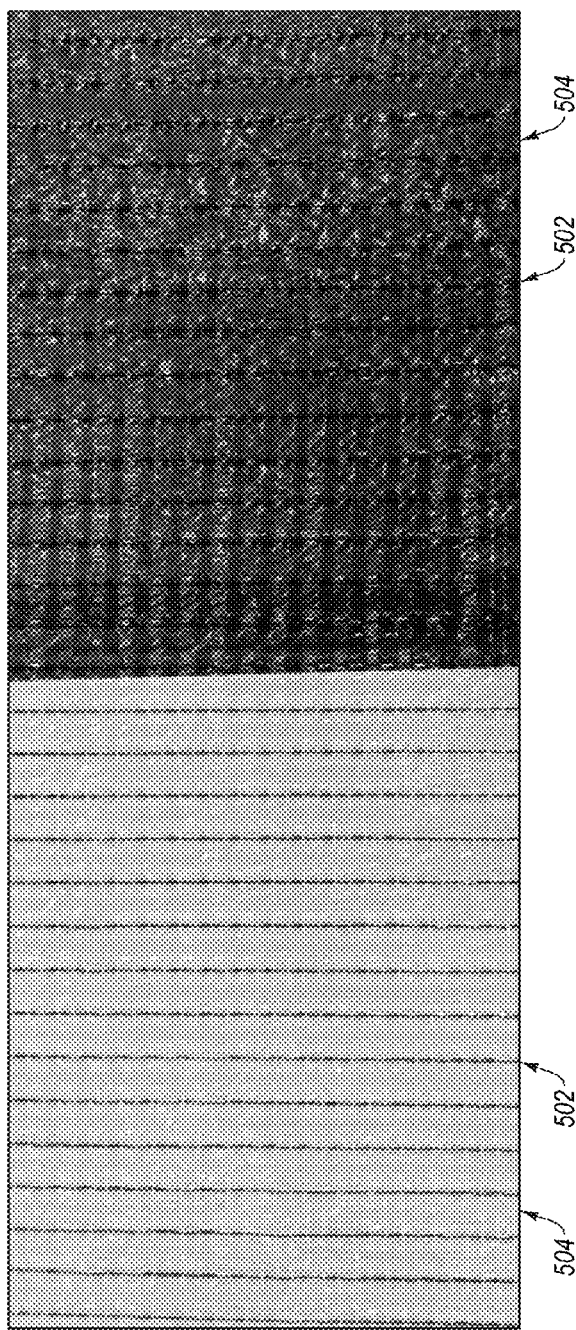
Figures 2, 5B:
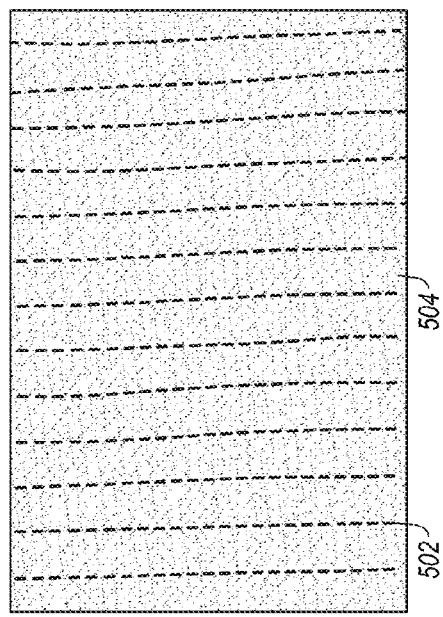
Figures 1, 5C:
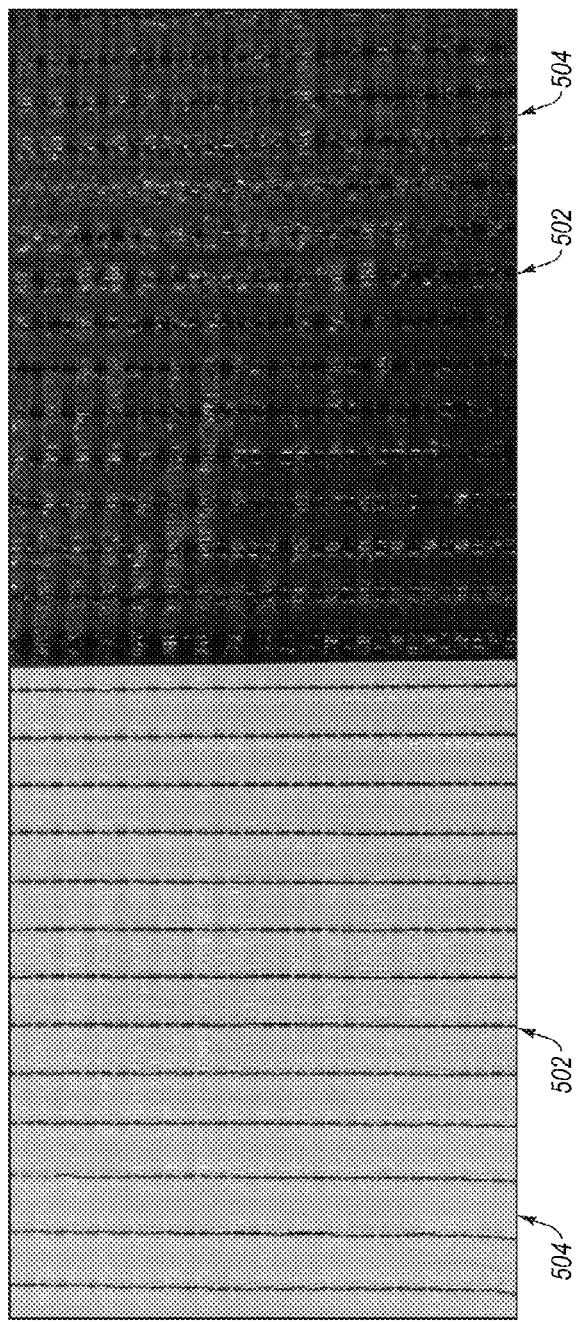
Figures 2, 5C:
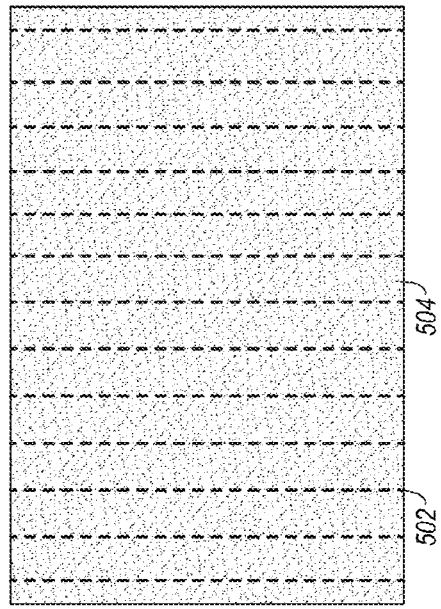

FIGS. 5*b*-1 and 5*b*-2, however, show the effects of applying an MD stretching process, to the film of FIGS. 5*a*-1 and 5*a*-2, where the ribs 502 are colored, but otherwise comprise no voiding agents that might change or enhance color with stress. The MD ring rolling was performed using a 200 pitch tool and a DOE of about 150 mils. Specifically, FIGS. 5*b*-1 and 5*b*-2 show that applying MD stretching under these parameters can produce some intermittent deformation of the film at uniform points along the ribs 502, and a corresponding hazier appearance of the ribs 502, but otherwise produce no color change to the ribs 502. Similarly, the web 504 can become hazier as well, but otherwise undergo no color change. The additional application, to the film of FIGS. 5*b*-1 and 5*b*-2, of a TD process using a 40 pitch tool and a DOE of about 20 mils produced no discernible change in the ribs 502 or intervening film 504, as indicated in FIGS. 5*c*-1 and 5*c*-2. As discussed in more detail below, the aforementioned intermittent deformation of the ribs 502 is another example of indicia that may be produced in connection with various embodiments.

F.4 Example Film 'H'

FIGS. 6*a*-1 through 6*c*-2 and the corresponding text provide details concerning an example ribbed film referred to herein as Film 'H.' As indicated in those figures, Film 'H' is a ribbed film. In this particular example, Film 'H' is an extruded film that comprises three layers of linear low-density polyethylene (LLDPE). In this example, Film 'H' has a layer structure of A:B:A. The layer ratio for the three layers is about 20:60:20.

In this example, the core layer comprised about 6 percent black masterbatch, and the skin layers contained about 20 percent CaCO3 masterbatch. The ribs 602 of Film 'H' averaged about 6.5 mils tall, with an average spacing between ribs 602 of about 0.336 inches. The thickness of the intervening film 604 between the ribs 602 was targeted to be about 0.50 mils thick.

Figures 1, 6A:
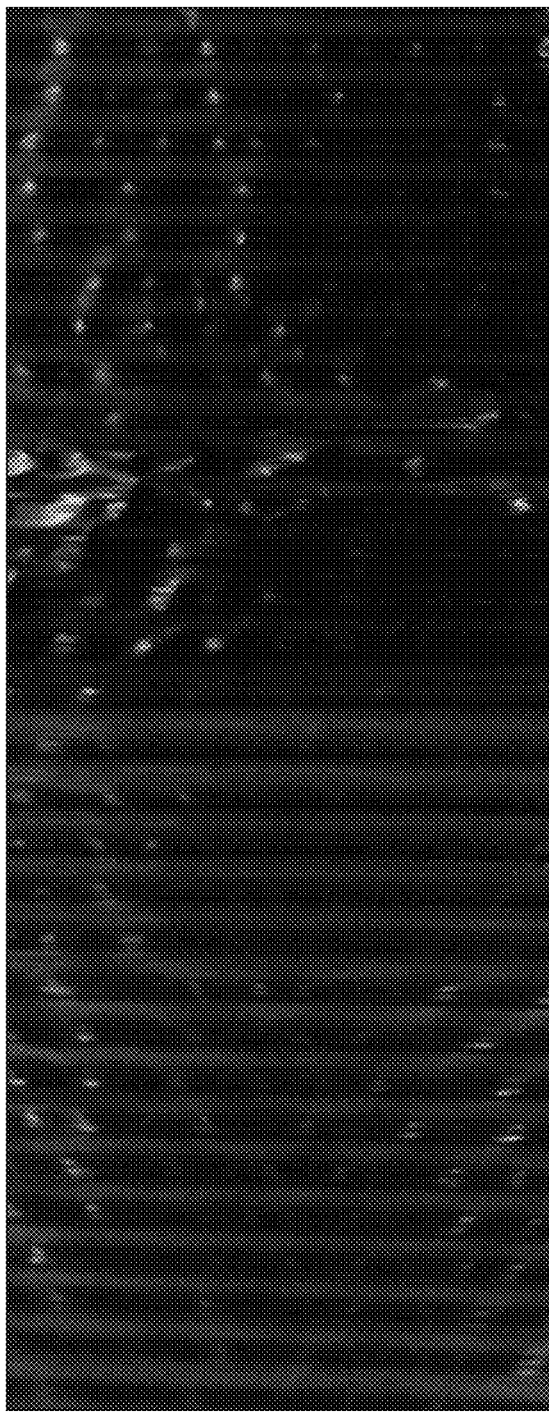
Figures 2, 6A:
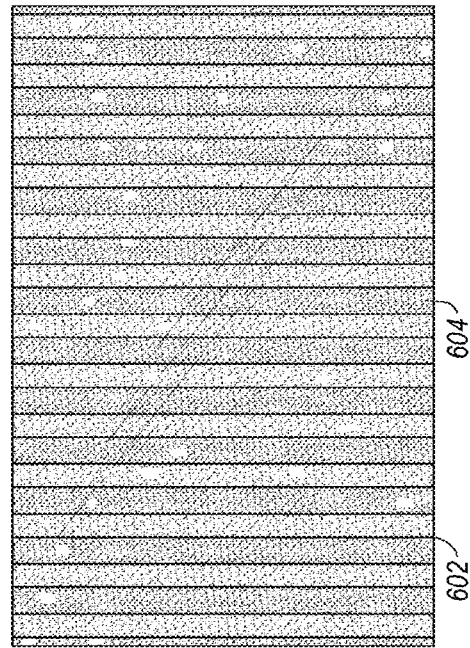
Figures 1, 6C:
Figures 2, 6C:
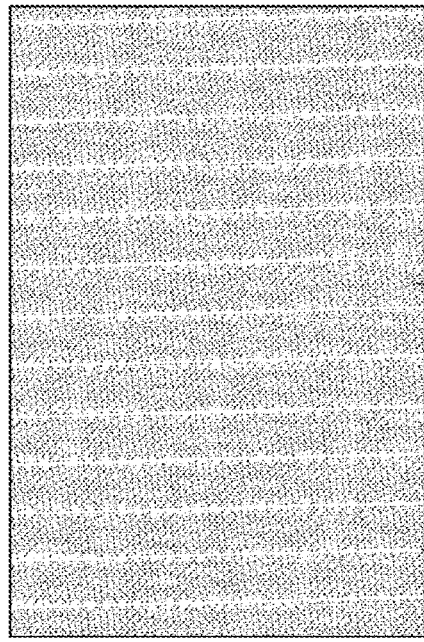

Observation of Film 'H' in FIGS. 6*a*-1 and 6*a*-2 reveals hazy, gray colored ribs, and black film between the ribs. The sample of FIGS. 6*a*-1 and 6*a*-2 was not subjected to any post-extrusion processing. In the sample of FIGS. 6*b*-1 and 6*b*-2, which reflects application of an MD stretching process with a 200 pitch tool at a DOE of about 150 mils, the ribs 602 have a white, stitched appearance, and the black film between the ribs 602 remains black. As indicated in FIGS. 6*c*-1 and 6*c*-2, a TD stretching process, with a 40 pitch tool at about 20 mils DOE, performed subsequent to the MD stretching process resulted in no color change to the ribs 602 or to the film between the ribs 62, as compared with the film of FIGS. 6*b*-1 and 6*b*-2.

G. Example Discontinuously Laminated Film Structures

As noted above, the various films, including ribbed films, disclosed herein may be employed in the construction of discontinuously laminated film structures. Following is a discussion of eight example, discontinuously laminated film structures that each employ one of the example films disclosed herein. The aforementioned discontinuously laminated film structures are presented only by way of example and are not intended to limit the scope of the invention in any way. With attention now to FIGS. 7-11, details are provided concerning some example discontinuously laminated film structures.

G.1 Structure 1

Figures 1, 7:
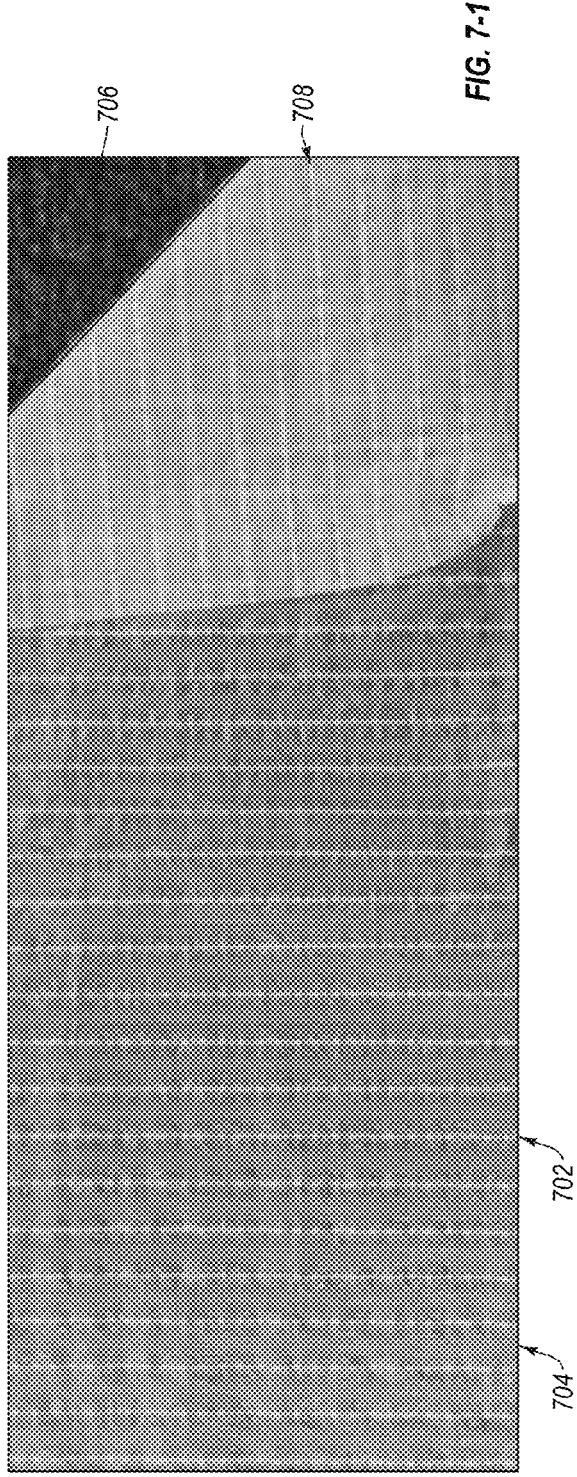
Figures 2, 7:
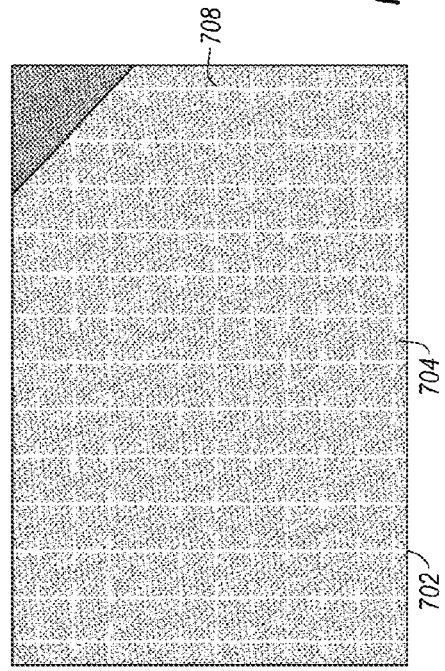

Directing attention first to FIGS. 7-1 and 7-2, Discontinuously Laminated Film Structure 1 (Structure 1) production parameters included MD RR, Insertion, TD RR. Structure 1 was created with the outer layer being un-stretched ribbed Film 'B' described above in connection with FIGS. 4*a*-4*c*. The inner layer was a 0.5 mil 0.920 density LLDPE black film containing approximately 5 percent carbon black masterbatch. Prior to insertion of the black inner film into the outer film, the C-folded films were stacked one upon the other and MD ring rolled at 190 DOE with a 200 pitch tool. The black inner film was then inserted into the un-pigmented outer film and the composite TD ring rolled at 20 DOE with a 40 pitch tool.

On viewing the laminated structure, Structure 1 appeared as two toned, having white ribs 702 interconnected by metallic or silver webs 704 on the outside with a black inner film 706. In addition, the white ribs 702 were visually discontinuous, with a small white "star" or dot 708 on the rib 702 where the MD tool contacted the rib 702.

G.2 Structure 2

Directing attention now to FIGS. 8-1 and 8-2, Discontinuously Laminated Film Structure 2 (Structure 2) production parameters included Insertion, MD, and TD RR. Structure 2 was created with the outer film being un-stretched ribbed Film 'B' described above. The inner film was a 0.5 mil 0.920 density LLDPE black film containing about 5 percent carbon black MB. The black inner film was inserted into the un-pigmented ribbed outer film, and the resulting composite structure was then MD ring rolled at 190 DOE with a 200 pitch tool, followed immediately by TD ring rolling at 20 DOE with a 40 pitch tool. In embodiments such as this, namely, where insertion is performed prior to any ring rolling process, this sequence of insertion and ring rolling may be advantageous inasmuch as insertion of films prior to ring rolling can help to better maintain the structural integrity of the involved films, and also help reduce the presence of entrained air between the films.

On viewing the laminated structure, Structure 2 appeared as being two toned, having white ribs 802 interconnected by metallic-looking webs 804 on the outside with a black inner film 806. In addition, the white ribs 802 were visually discontinuous, with a small white "star" or dot 808 on the rib 802 where the MD tool contacted the rib 802. Furthermore, there were black "stitch" marks 810 on the interconnected webs 804 adjacent on either side of the white stars 808 on the ribs 802.

G.3 Structure 3

Figures 1, 9:
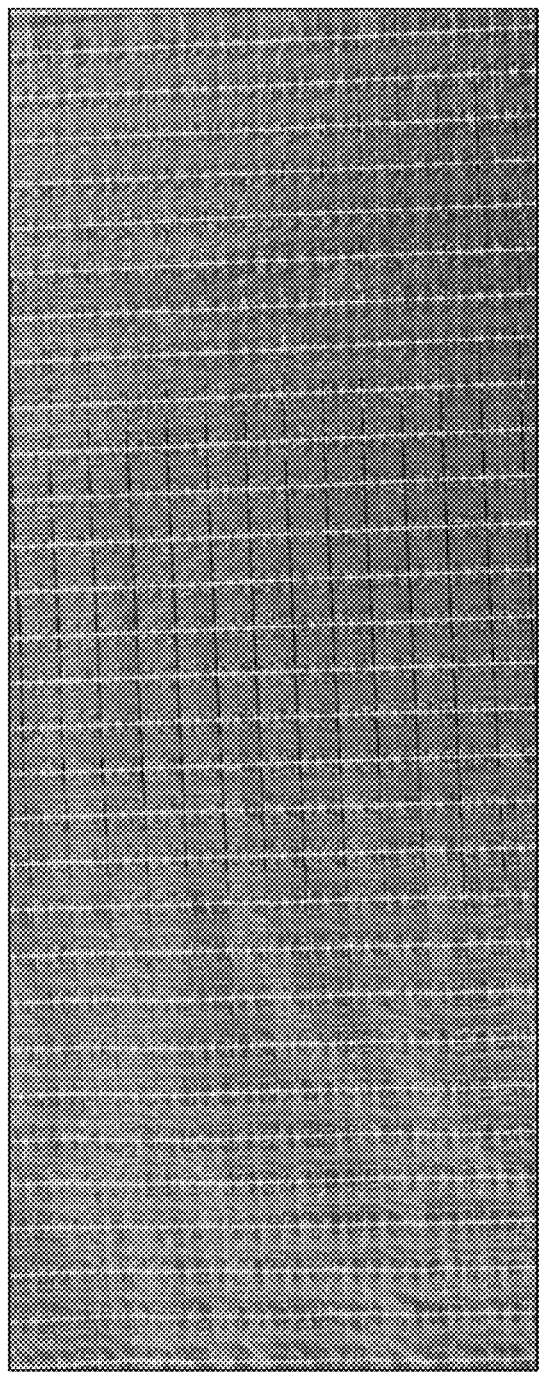
Figures 2, 9:
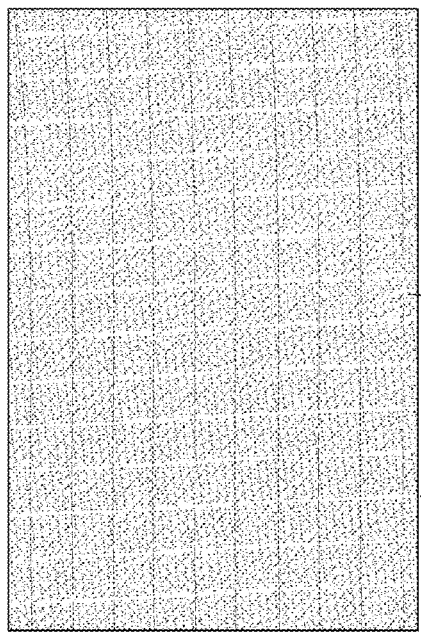

Directing attention now to FIGS. 9-1 and 9-2, Discontinuously Laminated Film Structure 3 (Structure 3) production parameters included Insertion, and MD RR. Structure 3 is the same as Structure 2 described above except without TD RR.

The appearance of Structure 3 was similar to as described in Structure 2 above, except the webs 902 between the ribs 904 alternate in and out of plane in a strongly visible zigzag manner in the machine direction. Also, Structure 3 was thicker than Structure 2, owing to lack of TD stretching in the production of Structure 3.

G.4 Structure 4

Figures 1, 10:
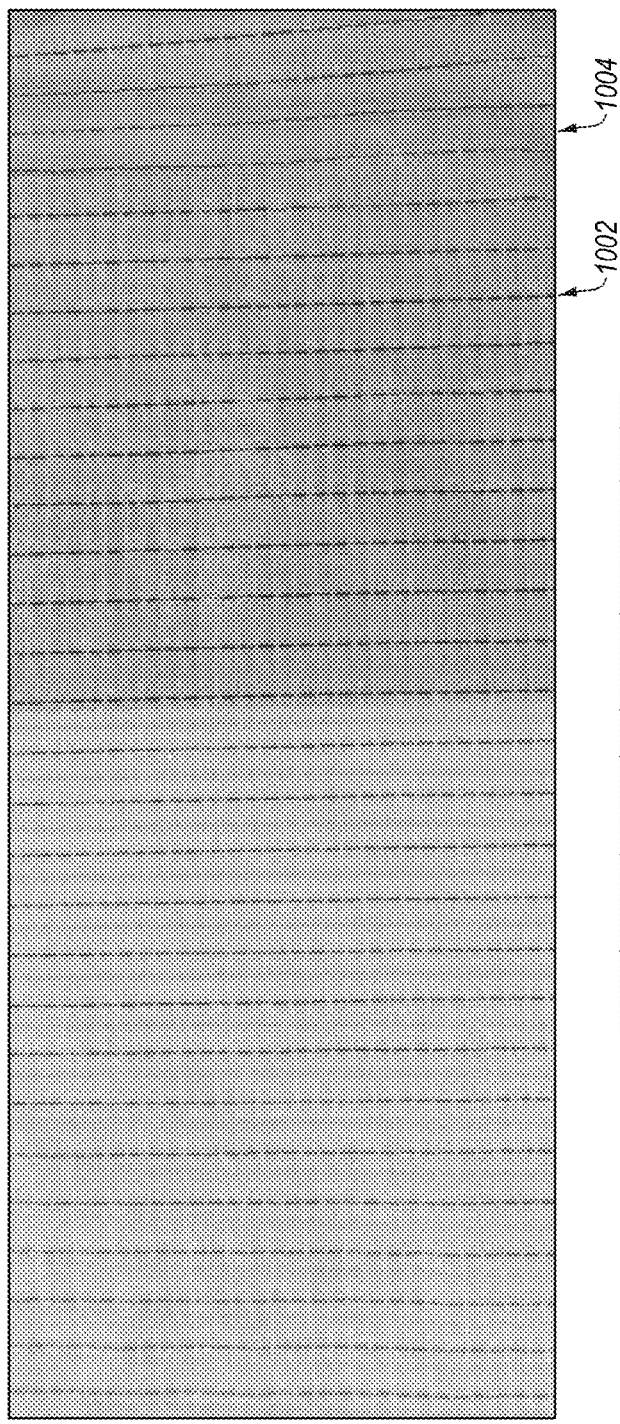
Figures 2, 10:
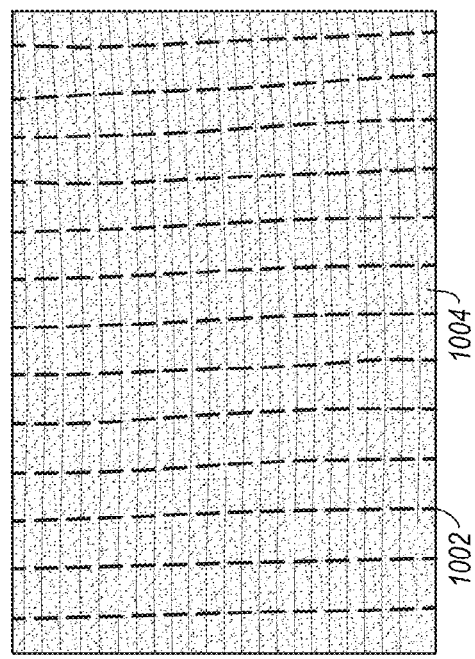

Directing attention now to FIGS. 10-1 and 10-2, Discontinuously Laminated Film Structure 4 (Structure 4) production parameters included MD RR, Insertion, and TD RR. Structure 4 was created with the outer film being un-stretched ribbed Film C described above.

The inner film was a 0.5 mil 0.920 density LLDPE white film containing approximately 5 percent white MB. Prior to insertion of the white inner film into the outer ribbed film, the C-folded films were stacked one upon the other and MD ring rolled at 190 DOE with a 200 pitch tool. The white inner film was then inserted into the ribbed outer film and the resulting composite TD ring rolling at 20 DOE with a 40 pitch tool.

On viewing the laminated structure, Structure 4 appeared as being two toned, having black ribs 1002 interconnected by silver webs 1004 on the outside with a white inner film 1006. In addition, the black ribs 1002 appeared discontinuous, with an apparent "break" in the rib 1002 occurring where the MD tooth contacted the rib 1002, creating a "stitched" appearance of the ribs 1002.

G.5 Structure 5

Directing attention now to FIGS. 11-1 and 11-2, Discontinuously Laminated Film Structure 5 (Structure 5) production parameters included Insertion, MD, and TD RR. Structure 5 was created with the outer film being un-stretched Film C described above. The inner film was a 0.5 mil 0.920 density LLDPE white film containing approximately 5% white MB. The white inner film was inserted into the ribbed outer film and the resulting composite structure then MD ring rolled at 190 DOE with a 200 pitch tool, followed immediately by TD ring rolling at 20 DOE with a 40 pitch tool.

On viewing the laminated structure, the composite structure appeared as being two toned, having black ribs 1102 interconnected by silver webs 1104 on the outside with a white inner film 1106. In addition, the black ribs 1102 appeared discontinuous, with an apparent "break" in the rib 1102 occurring where the MD tooth contacted the rib 1102, creating a "stitched" appearance in the ribs 1102. Furthermore, the webs 1104 between the ribs 1102 appear to alternate in and out of plane in a zigzag manner in the machine direction.

G.6 Structure 6

Discontinuously Laminated Film Structure 6 (Structure 6) production parameters included Insertion, and MD RR. Structure 6 is the same as Structure 5 described above except without TD RR.

The appearance of Structure 6 was similar to that of Structure 2 described above, except the webs between the ribs alternate in and out of plane in a strongly visible zigzag manner in the machine direction. Also, the composite film was thicker owing to lack of TD stretching.

G.7 Structure 7

Discontinuously Laminated Film Structure 7 (Structure 7) production parameters included Insertion, and 100 Pitch MD RR.

The appearance of Structure 7 was the same as Structure 6 described above except with finer MD tool markings on the ribbed outer film, resulting in a tighter pitched stitched appearance. In addition, in Structure 7, the pitch of the webs between the ribs alternating in and out of plan is finer, resulting in a tighter, more pleasing zigzag pattern. This tighter zigzag pattern appears to enhance and intensify the silver color compared to Structure 7 above.

G.8 Structure 8

Discontinuously Laminated Film Structure 8 (Structure 8) production parameters included Insertion, 100 Pitch MD, and TD RR. The appearance of Structure 8 was the same as Structure 7 above except that TD RR was applied after the MD RR. The TD RR modulates the amplitude of the in and out of plane zigzag pattern in the webs between the ribs. This pattern results in a slightly less intense silver color compared to Structure 7 above.

H. Examples of Production Processes and Resulting Indicia

As will be apparent from the foregoing discussion and example films and structures, various processes may be employed to provide indicia that may convey information to a user concerning an end product in which the film and/or structure is employed.

H.1 Example Production Processes

As noted earlier, at least some of the processes that may be employed to create the discontinuously laminated film structures disclosed herein generally involve the bonding of ribbed first film portion to a second un-ribbed film portion so as to define a region of discontinuous lamination between the first film portion and the second film portion. The region of discontinuous lamination comprises both a plurality of regions where the first and second film portions are bonded together, and a plurality of regions where the first and second film portions are not bonded together.

Figure 12:
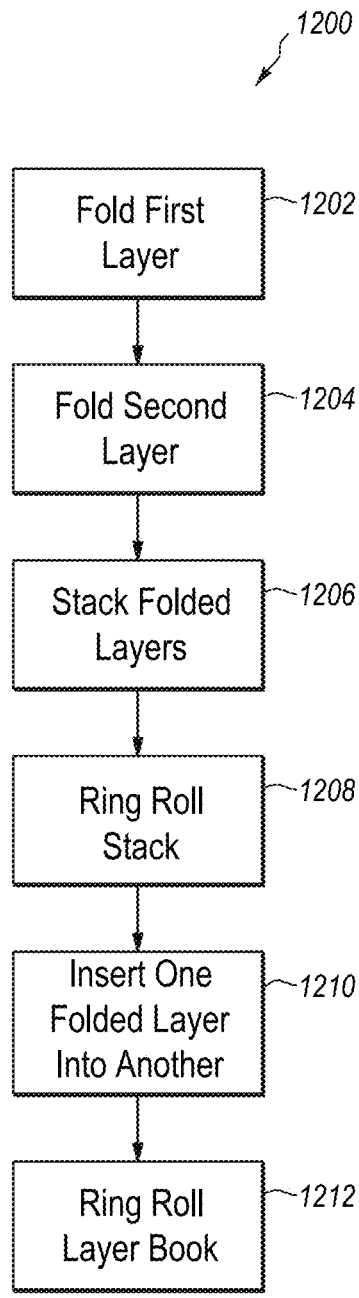
FIG. 12 is an example process suitable to form a discontinuously laminated film structure.
Figure 13:
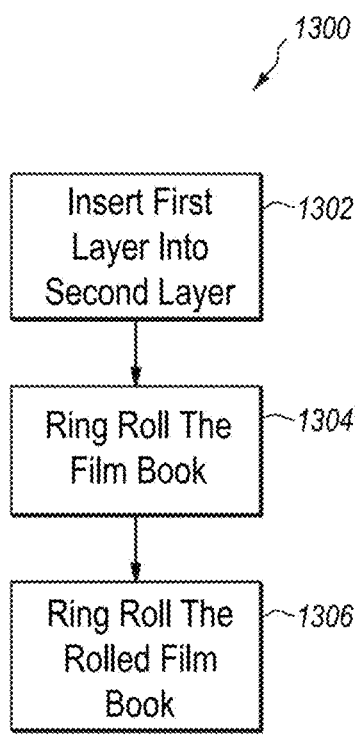
FIG. 13 is another example process suitable to form a discontinuously laminated film structure.

With attention now to FIGS. 12 and 13, examples of some discontinuous lamination processes are set forth in detail. In should be noted that while certain processes are described as being performed in a particular order, such description is not intended to limit the scope of the invention. Rather, the recited processes may be performed in any suitable order and, moreover, additional or alternatives to any of the processes may be employed. Moreover, all of the recited processes need not be performed. Rather, one or more of the processes may be omitted.

Directing attention first to FIG. 12, an example process 1200 is disclosed that may be used to form, for example, Structures 1, 4 and 5 disclosed herein.

Process 1200 begins at 1202 where a first film is folded, such as by C-folding for example. At 1204, a second film is folded, such as by C-folding for example. In at least some embodiments, the outer film, whether it is the first or second film, is a ribbed precursor film formed by a process such as extrusion. In those and/or other embodiments, the inner film may have an opaque color, such as black or white, for example, although other colors may be used. As well, the ribbed precursor film may include colors such as black or white, for example, in one or both of the ribs and webs between the ribs. In some instances, the C-folding process, or other folding process, may be omitted.

The folded first film and folded second film are then stacked 1206 to form a film stack. At 1208, the film stack is processed, such as by a cold or hot rolling process. In either case, the rolling process may be an MD ring rolling process, although other rolling processes such as TD and/or DD ring rolling could additionally, or alternatively, be employed. At 1210, one of the C-folded films, which could be either the first or second film, is inserted into the other C-folded film, which could be either the first or second film, so as to form a film 'book' configuration. Where an MD ring rolling process is performed on the film book, the film book may assume a corrugated appearance, with corrugations that are generally perpendicular to the extruded ribs of the outer layer.

Finally, at 1212, the film book is ring rolled. In at least some embodiments, a TD ring rolling process is used. However, other ring rolling processes may additionally or alternatively be employed.

In one variation of process 1200, the final TD ring rolling process 1212 is omitted. This variation may be used to form, for example, Structure 6 disclosed herein. In another variation, the TD ring rolling process 1212 immediately follows the MD ring rolling process 1208. This latter variation may be used to form, for example, Structure 8 disclosed herein.

Directing attention now to FIG. 13, an example process 1300 is disclosed that may, for example, be used to form Structure 2 disclosed herein.

Process 1300 begins at 1302 where an inner film is inserted into an outer film to form, for example, a film book. The inner film may be a black film, and the outer film may be a ribbed precursor film, although different inner and/or outer films could be used. At 1304, the film book is ring rolled, such as by MD ring rolling for example. Thereafter, at 1306, the MD ring rolled film book is ring rolled, such as by TD ring rolling for example.

As noted above, variations of the processes disclosed herein are possible. Accordingly, in at least one alternative embodiment, the TD ring rolling process may be omitted from process 1300.

H.2 Example Indicia and Their Formation

In connection with the processes disclosed herein, including those set forth in FIGS. 12 and 13, various physical indicators may result from the performance of those processes and/or may be present in precursor films used in such processes. Consistent with the foregoing, and as set forth in the discussion of the structures below, such indicia may include, for example, elements such as colors, dyes, pigments, textures, ribs, corrugations, stars, dots, bars, stitches, discontinuous lines, and combinations of any of the foregoing. Not only are such indicia readily apparent to a user of, for example, an end product in which the discontinuously laminated film structure is employed, but such indicia may be advantageous insofar as they are perceptible by one or more senses of a user.

Various types of indicia may be present in a particular end product, discontinuously laminated film structure, or precursor film. For example, one type of indicia may convey to a user certain information concerning an attribute of an end product. Another type of indicia may serve a largely cosmetic or aesthetic purpose. The foregoing and/or other types of indicia may be combined, for example, in a single end product.

By way of illustration, indicia may indicate visually, and/or in a tactile sense, certain attributes of the end product such as, for example, a relative strength of the product. Thus, the extruded ribs present in a precursor film enhance the strength of the precursor film. As well, such extruded ribs also provide a visible and tactile indicator, to a user, of the strength of the film and/or the strength of a discontinuously laminated film structure or end product in which that film is employed.

As another example, the stars or dots present in some of the 'Structures' noted below serve as an indicator of highly localized stress whitening, such as may be obtained with various combinations of ring rolling processes, such as MD and/or TD ring rolling. The highly localized stress whitening, which may result from ring rolling in a direction generally orthogonal to a direction of extruded ribs of a film, can serve as an indicator to a consumer as to the strength of the discontinuously laminated film structure, since the localized stress whitening occurs at points where the extruded ribs are worked by the teeth of a roller.

Moreover, the formation of indicia, such as color intensification in the form of localized stress whitening, or can be localized and controlled using various combinations of voiding agents, coloring agents such as dyes and pigments, and various stretching processes such as hot and/or cold MD and/or TD ring rolling. Indeed, such whitening can be highly localized, if desired, as evidenced by indicia such as the dots and stars disclosed elsewhere herein. More generally, stress-sensitive agents such as voiding agents, and coloring agents such as dyes and pigments, can be employed in one or more films of a discontinuously laminated film structure such that formation of the films and/or the discontinuously laminated film structure causes a change to the element(s) that include the agent, thereby providing a visible manifestation of induced stress and/or strain.

As noted above, some indicia within the scope of this disclosure may be largely cosmetic or aesthetic in nature. For example, MD ring rolling of the extruded ribs in a ribbed precursor film provides an interesting visual effect that may have little to do with the strength or integrity of the precursor film or associated discontinuously laminated film structure.

Finally, and with regard to the foregoing discussion, it will be apparent that insofar as indicia convey to a user information concerning a property of a precursor film, discontinuously laminated film structure, and/or end product, such indicia are example implementations of means for conveying information perceptible by a sense of a user. Thus, the indicia disclosed herein are provided solely by way of example, and any other indicia of comparable functionality may alternatively be employed.

In light of the disclosure herein, it will be appreciated that embodiments of the invention may be advantageous in various ways relative to conventional structures and processes. Below are set forth various examples of some advantages that may be achieved in connection with one or more embodiments of the invention. It is not necessary that all of such examples be present in any particular embodiment, nor is it necessary that any particular example be present in an embodiment. Finally, it should be noted that the examples set forth below are provided solely by way of illustration and are not intended, nor should be construed, to limit the scope of the invention in any way.

I. Example Advantages of Some Embodiments

With regard now to some possible advantages of example embodiments, one or more embodiments of the invention may substantially maintain their color characteristics, notwithstanding temporary or permanent deformation of the film. As another example, one or more embodiments of the invention may implement various visual effects, such as coloration, with non-metallic films. As a further example, one or more embodiments of the invention may implement various visual effects such as coloration without the use of color-generating laminates or films. As yet another example, one or more embodiments of the invention may provide visual effects such as coloration without requiring user manipulation, such as by bending or delamination for example, with regard to the finished film. Moreover, one or more embodiments of the invention may implement desired visual effects with discontinuously laminated films, and thus do not require intimate contact between films. As well, one or more embodiments of the invention may implement desired visual effects with film structures that include at least one ribbed film.

Further, one or more embodiments of the invention may realize a relative increase in strength as a result of MD rolling and/or TD rolling of a ribbed precursor film or a laminated film that includes such a rolled precursor film. Moreover, the relative strength of the film and/or of a product that employs the film may be visually indicated to a user by indicia such as a color, color intensification such as by imposition of stress or strain, contrasting colors, and/or distribution of the color in the film or product. As another example, the incremental stretching processes disclosed herein, such as TD and MD ring rolling for example, may be advantageous over conventional continuous-stretch processes that do not produce indicia and the other effects noted herein. As a final example, one or more of the embodiments disclosed herein may be advantageous inasmuch as they possess, or produce, as applicable, indicia using a continuous process. More conventional processes, such as stamping or embossing, are not well suited to be implemented in a continuous fashion. Rather, only discrete portions of the film can be stamped or embossed.

The present invention may be embodied in other specific forms without departing from its spirit or essential characteristics. For example, the illustrated and described implementations involve non-continuous (i.e., discontinuous or partially discontinuous lamination) to provide the light bonds. In alternative implementations, the lamination may be continuous. For example, films could be co-extruded so that the films have a bond strength that provides for delamination prior to film failure to provide similar benefits to those described above. Thus, the described embodiments are to be considered in all respects only as illustrative and not restrictive. All changes that come within the meaning and range of equivalency of the claims are to be embraced within their scope.

What is claimed is:

1. A laminated film, comprising:
   a first film that includes a plurality of extruded ribs, wherein consecutive extruded ribs are separated by webs that are integral with the extruded ribs, wherein the first film includes a plurality of thinner stretched linear areas that alternate with a plurality of thicker linear areas, wherein the thinner stretched linear areas and the thicker linear areas are formed in the webs and extruded ribs of the first film;
   a second film that is devoid of extruded ribs; and
   discontinuous lamination between the first film and the second film, the discontinuous lamination comprising:
      a plurality of regions where the first and second films are bonded together; and
      a plurality of regions where the first and second films are not bonded together.

2. The laminated film of claim 1, wherein the extruded ribs are substantially parallel to a machine direction.

3. The laminated film of claim 1, wherein the thinner stretched linear areas and the thicker linear areas extend orthogonally to the extruded ribs of the first film.

4. The laminated film of claim 1, wherein the first film has a first color, and the second film has a second color that is different from the first color.

5. The laminated film of claim 1, wherein there is a visible contrast between the extruded ribs and the webs of the first film, and the visible contrast is at least one of: a contrast in color; or a contrast in intensity of color.

6. The laminated film of claim 1, further comprising indicia perceptible by a user, the indicia comprising one or more of:
   indicia that are substantially cosmetic in nature; or
   indicia that convey information concerning a property of the laminated film.

7. The laminated film of claim 6, wherein the indicia identify areas of localized stress concentration.

8. A laminated film, comprising:
   a first film that includes:
      a plurality of extruded ribs separated by webs, wherein there is a visible contrast between the extruded ribs and the webs, and the visible contrast comprises one or more of: a contrast in color, or a contrast in intensity of color, wherein the extruded ribs are parallel to a machine direction, and the first film includes a plurality of thinner stretched linear areas that alternate with a plurality of thicker linear areas, wherein the thinner stretched linear areas and the thicker linear areas are formed in the webs and extruded ribs of the first film and extend orthogonally to extruded ribs of the first film; and
      a stress-sensitive agent;
   a second film; and
   discontinuous lamination between the first film and the second film, the discontinuous lamination comprising:
      a plurality of regions where the first and second films are bonded together; and
      a plurality of regions where the first and second films are not bonded together.

9. The laminated film of claim 8, wherein the stress-sensitive agent comprises one of a coloring agent, and a voiding agent.

10. The laminated film of claim 8, wherein the stress-sensitive agent is a voiding agent.

11. The laminated film of claim 8, wherein the second film is white or black.

12. The laminated film of claim 8, wherein all of the thinner stretched linear areas and the thicker linear areas extend orthogonally to the extruded ribs of the first film.

13. The laminated film of claim 8, wherein the first film comprises a plurality of layers of linear low-density polyethylene (LLDPE).

14. A plastic product at least partly constructed from the laminated film of claim 1, wherein the plastic product comprises one of a grocery bag, a trash bag, a sack, a yard waste bag, packaging materials, a feminine hygiene product, a baby diaper, and adult incontinence product, a sanitary napkin, a bandage, a food storage bag, a food storage container, a thermal heat wrap, a facial mask, a cleaning wipe, and a hard surface cleaner.

15. The laminated film of claim 1, wherein:
   the webs of the first layer are transparent;
   the extruded ribs of the first layer are a first color;
   the second layer is a second color; and
   when looking at the first layer side of the laminated film, the webs of the first layer appear a third color that differs from the first color and the second color.

16. The laminated film of claim 15, wherein:
   the extruded ribs are white;
   the second layer is black; and
   the webs of the first layer appear silver or a grey metallic.

17. The laminated film of claim 15, wherein:
   the extruded ribs are black;
   the second layer is white; and
   the webs of the first layer appear silver or a grey metallic.

18. The laminated film of claim 8, wherein:
   the webs of the first layer are transparent;
   the extruded ribs of the first layer are a first color;
   the second layer is a second color; and
   when looking at the first layer side of the laminated film, the webs of the first layer appear a third color that differs from the first color and the second color.

19. The laminated film of claim 18, wherein:
   the extruded ribs are white;
   the second layer is black; and
   the webs of the first layer appear silver or a grey metallic.

20. The laminated film of claim 18, wherein:
   the extruded ribs are black;
   the second layer is white; and
   the webs of the first layer appear silver or a grey metallic.

* * * * *